US008309485B2

(12) United States Patent
Yang et al.

(10) Patent No.: US 8,309,485 B2
(45) Date of Patent: Nov. 13, 2012

(54) METHODS FOR PRODUCING METAL-CONTAINING SULFATED ACTIVATOR-SUPPORTS

(75) Inventors: Qing Yang, Bartlesville, OK (US); Max P. McDaniel, Bartlesville, OK (US); Tony R. Crain, Niotaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 292 days.

(21) Appl. No.: 12/400,013

(22) Filed: Mar. 9, 2009

(65) Prior Publication Data
US 2010/0227989 A1 Sep. 9, 2010

(51) Int. Cl.
*B01J 31/02* (2006.01)
*B01J 31/14* (2006.01)
*C08F 4/42* (2006.01)

(52) U.S. Cl. ........ 502/104; 502/154; 502/155; 502/439; 526/159

(58) Field of Classification Search .............. 526/95, 526/159; 502/104, 154, 155, 439
See application file for complete search history.

(56) References Cited

U.S. PATENT DOCUMENTS

| 3,242,099 | A |   | 3/1966  | Manyik |
| 3,248,179 | A |   | 4/1966  | Norwood et al. |
| 4,060,480 | A |   | 11/1977 | Reed et al. |
| 4,076,923 | A |   | 2/1978  | Matsuura et al. |
| 4,421,674 | A | * | 12/1983 | Invernizzi et al. ............... 502/9 |
| 4,452,910 | A |   | 6/1984  | Hopkins et al. |
| 4,501,885 | A |   | 2/1985  | Sherk et al. |
| 4,588,790 | A |   | 5/1986  | Jenkins, III et al. |
| 4,794,096 | A |   | 12/1988 | Ewen |
| 4,808,561 | A |   | 2/1989  | Welborn, Jr. et al. |
| 5,352,749 | A |   | 10/1994 | DeChellis et al. |
| 5,376,611 | A |   | 12/1994 | Shveima |
| 5,436,304 | A |   | 7/1995  | Griffin et al. |
| 5,455,314 | A |   | 10/1995 | Burns et al. |
| 5,565,175 | A |   | 10/1996 | Hottovy et al. |
| 5,575,979 | A |   | 11/1996 | Hanson |
| 5,576,259 | A |   | 11/1996 | Hasegawa et al. |
| 5,807,938 | A |   | 9/1998  | Kaneko et al. |
| 5,919,983 | A |   | 7/1999  | Rosen et al. |
| 6,107,230 | A |   | 8/2000  | McDaniel et al. |
| 6,165,929 | A |   | 12/2000 | McDaniel et al. |
| 6,235,918 | B1 | * | 5/2001  | Marks et al. .................. 556/53 |
| 6,239,235 | B1 |   | 5/2001  | Hottovy et al. |
| 6,262,191 | B1 |   | 7/2001  | Hottovy et al. |
| 6,294,494 | B1 |   | 9/2001  | McDaniel et al. |
| 6,300,271 | B1 |   | 10/2001 | McDaniel et al. |
| 6,316,553 | B1 |   | 11/2001 | McDaniel et al. |
| 6,355,594 | B1 |   | 3/2002  | McDaniel et al. |
| 6,376,415 | B1 |   | 4/2002  | McDaniel et al. |
| 6,388,017 | B1 |   | 5/2002  | McDaniel et al. |
| 6,391,816 | B1 |   | 5/2002  | McDaniel et al. |
| 6,395,666 | B1 |   | 5/2002  | McDaniel et al. |
| 6,524,987 | B1 |   | 2/2003  | Collins et al. |
| 6,548,441 | B1 |   | 4/2003  | McDaniel et al. |
| 6,548,442 | B1 |   | 4/2003  | McDaniel et al. |
| 6,576,583 | B1 |   | 6/2003  | McDaniel et al. |
| 6,613,712 | B1 |   | 9/2003  | McDaniel et al. |
| 6,632,894 | B1 |   | 10/2003 | McDaniel et al. |
| 6,667,274 | B1 |   | 12/2003 | Hawley et al. |
| 6,750,302 | B1 |   | 6/2004  | McDaniel et al. |
| 6,833,338 | B2 |   | 12/2004 | McDaniel et al. |
| 6,833,415 | B2 |   | 12/2004 | Kendrick et al. |
| 6,838,533 | B2 |   | 1/2005  | McDaniel et al. |
| 6,887,819 | B2 |   | 5/2005  | McDaniel et al. |
| 7,064,225 | B2 |   | 6/2006  | Thorn et al. |
| 7,214,642 | B2 |   | 5/2007  | McDaniel et al. |
| 2003/0216525 | A1 | * | 11/2003 | McDaniel et al. ............... 526/64 |
| 2005/0113243 | A1 |   | 5/2005  | Thorn et al. |
| 2005/0113245 | A1 |   | 5/2005  | Martin et al. |
| 2005/0148744 | A1 | * | 7/2005  | Kao ............................ 526/114 |
| 2005/0288461 | A1 |   | 12/2005 | Jensen et al. |
| 2007/0043176 | A1 | * | 2/2007  | Martin et al. .................... 526/64 |
| 2007/0111883 | A1 |   | 5/2007  | Jayaratne et al. |
| 2007/0179044 | A1 |   | 8/2007  | Yang et al. |
| 2007/0232483 | A1 | * | 10/2007 | Yang et al. .................... 502/152 |
| 2008/0293895 | A1 | * | 11/2008 | Kao ............................... 526/97 |
| 2010/0317904 | A1 |   | 12/2010 | Small et al. |

FOREIGN PATENT DOCUMENTS

| EP | 0683150 A2 | 11/1995 |
| EP | 1097494 A1 | 5/2001 |
| JP | 46028763 B | 8/1971 |
| WO | WO 99/60033 | 11/1999 |
| WO | WO 01/44309 | 6/2001 |
| WO | WO 2004/029105 | 4/2004 |
| WO | WO 2004/055053 | 7/2004 |

OTHER PUBLICATIONS

Bird, R.B., et al., Dynamics of Polymeric Liquids, vol. 1, Fluid Mechanics, 2nd Edition, John Wiley & Sons (1987), 171-172.
Hieber, C. A., et al., Rheol. Acta, 28, 321-332 (1989).
Hieber, C.A., et al., Polym. Eng. Sci., 32, 931-938 (1992).
Hongbo, et al., J. Am. Chem. Soc., 2005, 127, pp. 14756-14768.
U.S. Appl. No. 12/898,465, filed Oct. 5, 2010 entitled "Oligomerization of Olefin Waxes Using Metallocene-Based Catalyst Systems".
Hawley's Condensed Chemical Dictionary, 11th Ed., John Wiley & Sons, 1995, 3 pages.
Cotton et al., Advanced Inorganic Chemistry, 6th Ed., Wiley-Interscience, 1999, 4 pages.
Pinnavaia, "Intercalated Clay Catalysts," Science, 1983, 220(4595), pp. 365-371.
Thomas, "Sheet Silicate Intercalates: New Agents for Unusual Chemical Conversions*," Intercalation Chemistry (S. Whittington and A. Jacobson, eds.), Academic Press, Inc. Ch. 3, 1972, pp. 55-99.
Nicholas, Christopher P, et al., *Synthesis, Spectroscopy, and Catalytic Properties of Cationic Organizirconium Absrobates on "Super Acidic" sulfated Aluminia. "Single-Site" Heterogeneous Catalysts with Virtually 100% Active Sites*, J. Am. Chem. Soc. 2003, 125, 4325-4331.
International Patent Application PCT/US2010/000871—Search Report dated Sep. 14, 2010.

* cited by examiner

*Primary Examiner* — Robert D. Harlan

(74) *Attorney, Agent, or Firm* — Merchant & Gould P.C.

(57) ABSTRACT

The present invention provides metal-containing sulfated activator-supports, and polymerization catalyst compositions employing these activator-supports. Methods for making these metal-containing sulfated activator-supports and for using such components in catalyst compositions for the polymerization of olefins are also provided.

20 Claims, 4 Drawing Sheets

METHODS FOR PRODUCING METAL-CONTAINING SULFATED ACTIVATOR-SUPPORTS

BACKGROUND OF THE INVENTION

The present invention relates generally to the field of olefin polymerization catalysis, supported catalyst compositions, methods for the polymerization and copolymerization of olefins, and polyolefins. More specifically, this invention relates to metal-containing sulfated activator-supports, methods for producing such activator-supports, and to catalyst compositions employing these activator-supports.

Polyolefin homopolymers, copolymers, terpolymers, etc., can be produced using various combinations of catalyst systems and polymerization processes. One method that can be used to produce such polyolefins employs a metallocene-based catalyst system. Generally, metallocene catalysts produce polyolefins with a narrow molecular weight distribution, and without a high molecular weight tail to the molecular weight distribution. While a polymer having a narrow molecular weight distribution can be advantageous in certain polymer processing operations and end-use applications, it can be a drawback in others. Stability in certain polymer processing operations, such as in blown film, blow molding, and pipe extrusion, often is reduced with a narrow molecular weight distribution polymer, as compared to broader molecular weight distribution polymers, resulting in reduced output or production rates. The high molecular weight tail, or fraction, of the molecular weight distribution can provide higher melt strength and/or higher zero shear viscosity to the polymer which can improve processability and certain end-use properties in blown film, blow molding, pipe extrusion, and other related applications.

Hence, it would be beneficial to produce a relatively narrow molecular weight distribution polymer—as compared to, for instance, a polymer produced using a chromium catalyst—using a metallocene-based catalyst system, where the polymer has a high molecular weight tail to improve processing and end-use properties in certain polyolefin end-use applications. Accordingly, it is to these ends that the present invention is directed.

SUMMARY OF THE INVENTION

The present invention generally relates to metal-containing activator-supports, catalyst compositions employing these supports, methods for preparing the activator-supports and catalyst compositions, methods for using the catalyst compositions to polymerize olefins, the polymer resins produced using such catalyst compositions, and articles produced using these polymer resins. In accordance with one aspect of the present invention, a metal-containing sulfated activator-support is disclosed which comprises a contact product of:
- (i) a transition metal compound;
- (ii) a sulfate compound; and
- (iii) a solid oxide.

The metal-containing sulfated activator-support can be produced using different methods of synthesis. One such method to produce a metal-containing sulfated activator-support comprises these steps:
- (a) contacting a solid oxide with a sulfate compound to produce a sulfated solid oxide;
- (b) calcining the sulfated solid oxide to produce a calcined sulfated solid oxide; and
- (c) contacting the calcined sulfated solid oxide with
  - (i) a transition metal compound and a hydrocarbon solvent; or
  - (ii) a vapor comprising a transition metal compound;
to produce the metal-containing sulfated activator-support.

Alternatively, the metal-containing sulfated activator-support can be produced in accordance with the following procedure:
- (a) contacting a solid oxide with a sulfate compound while calcining to produce a calcined sulfated solid oxide; and
- (b) contacting the calcined sulfated solid oxide with
  - (i) a transition metal compound and a hydrocarbon solvent; or
  - (ii) a vapor comprising a transition metal compound;
to produce the metal-containing sulfated activator-support.

In either process, an optional step of removing the hydrocarbon solvent from the metal-containing sulfated activator-support can be employed. Additionally, the solid oxide can be calcined prior to step (a), if desired. Once the metal-containing sulfated activator-support has been produced, it does not need to be calcined, and generally is not calcined, prior to use in a catalyst composition for the polymerization of olefins.

Catalyst compositions containing these metal-containing sulfated activator-supports are also provided by the present invention. In one aspect, the catalyst composition can comprise a contact product of a metallocene compound and a metal-containing sulfated activator-support. The metal-containing sulfated activator-support comprises a contact product of (i) a transition metal compound; (ii) a sulfate compound; and (iii) a solid oxide. This catalyst composition can further comprise an organoaluminum compound. In other aspects, the catalyst composition comprising a metallocene compound and a metal-containing sulfated activator-support can further comprise an optional co-catalyst. Suitable optional co-catalysts in this aspect include, but are not limited to, aluminoxane compounds, organozinc compounds, organoboron or organoborate compounds, ionizing ionic compounds, and the like, or combinations thereof.

Catalyst compositions of the present invention can be used to polymerize olefins to form homopolymers, copolymers, terpolymers, and the like. One such process for polymerizing olefins in the presence of a catalyst composition of the present invention comprises contacting the catalyst composition with an olefin monomer and optionally an olefin comonomer under polymerization conditions to produce an olefin polymer, wherein the catalyst composition comprises a contact product of a metallocene compound and a metal-containing sulfated activator-support. The activator-support comprises a contact product of (i) a transition metal compound; (ii) a sulfate compound; and (iii) a solid oxide. Other co-catalysts, including organoaluminum compounds, can be employed in this process.

Polymers produced from the polymerization of olefins, resulting in homopolymers or copolymers, for example, can be used to produce various articles of manufacture.

DEFINITIONS AND ABBREVIATIONS

Figure 1:
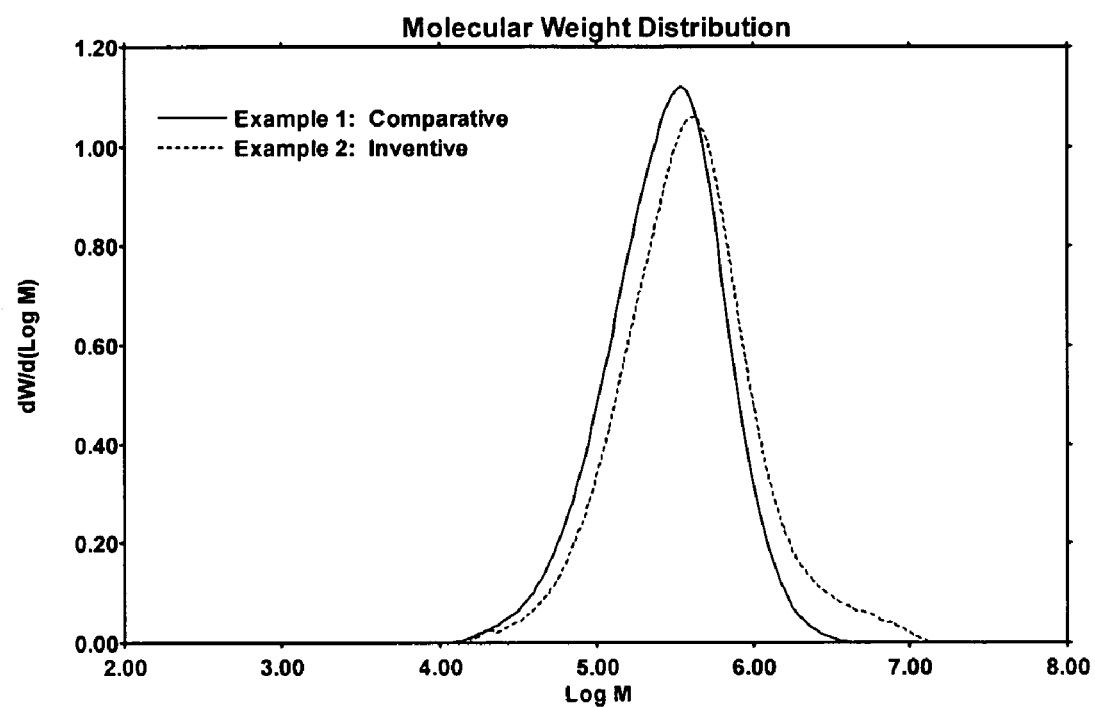
FIG. 1 presents a plot of the molecular weight distributions of the polymers of Examples 1-2.

To define more clearly the terms used herein, the following definitions and abbreviations are provided. To the extent that any definition or usage provided by any document incorporated herein by reference conflicts with the definition or usage provided herein, the definition or usage provided herein controls.

Bu—Butyl.
CZA-Ti—Titanium-containing chlorided zinc aluminate.
CZA-Zr—Zirconium-containing chlorided zinc aluminate.
FSA-Ti—Titanium-containing fluorided silica-alumina.
FSA-Zr—Zirconium-containing fluorided silica-alumina.
i-Pr—Isopropyl.
M—Molecular weight.
Me—Methyl.
Mn—Number-average molecular weight.
Mw—Weight-average molecular weight.
Mw/Mn—Ratio is a measure of the molecular weight distribution; also referred to as the polydispersity index.
Mz—Z-average molecular weight.
Mz/Mw—Ratio is a measure of the breadth of the high molecular weight fraction of the polymer.
Ph—Phenyl.
SA—Sulfated alumina.
SA-Ti—Titanium-containing sulfated alumina.
SA-V—Vanadium-containing sulfated alumina.
SA-Zr—Zirconium-containing sulfated alumina.
t-Bu—Tert-butyl or t-butyl.
TIBA—Triisobutylaluminum.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer would be categorized an as ethylene/1-hexene copolymer.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene), to produce a copolymer.

The term "co-catalyst" is used generally herein to refer to organoaluminum compounds that can constitute one component of a catalyst composition. Additionally, "co-catalyst" also refers to other optional components of a catalyst composition including, but not limited to, aluminoxanes, organoboron or organoborate compounds, and ionizing ionic compounds, as disclosed herein. The term "co-catalyst" is used regardless of the actual function of the compound or any chemical mechanism by which the compound may operate. In one aspect of this invention, the term "co-catalyst" is used to distinguish that component of the catalyst composition from the metallocene component.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[cation]^+[BY_4]^-$, where Y represents a fluorinated organic group. Materials of these types are generally and collectively referred to as "organoboron or organoborate compounds."

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another.

The term "precontacted" mixture is used herein to describe a first mixture of catalyst components that are contacted for a first period of time prior to the first mixture being used to form a "postcontacted" or second mixture of catalyst components that are contacted for a second period of time. Often, the precontacted mixture describes a mixture of metallocene compound (or compounds), olefin monomer, and organoaluminum compound (or compounds), before this mixture is contacted with an activator(s) and/or activator-support(s) and optional additional organoaluminum compound(s). Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one chemical compound, formulation, or structure different from the distinct organoaluminum compound used to prepare the precontacted mixture. In this case, the precontacted organoaluminum compound or component is described as comprising an organoaluminum compound that was used to prepare the precontacted mixture.

Alternatively, the precontacted mixture can describe a mixture of metallocene compound(s) and organoaluminum compound(s), prior to contacting of this mixture with the activator(s) and/or activator-support(s). This precontacted mixture also can describe a mixture of metallocene compound(s), olefin monomer, and activator(s) and/or activator-support(s), before this mixture is contacted with an organoaluminum co-catalyst compound or compounds.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene compound(s), olefin monomer, organoaluminum compound(s), and activator(s) and/or activator-support(s) formed from contacting the precontacted mixture of a portion of these components with any additional components added to make up the postcontacted mixture. For instance, the additional component added to make up the postcontacted mixture can be an activator-support, and optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

The term "metallocene," as used herein, describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound or an aluminoxane compound. Metallocene is also used herein to encompass mono-cyclopentadienyl or half-sandwich compounds, as well as compounds containing at least one cyclodienyl ring and compounds containing boratabenzene ligands. Further, metallocene is also used herein to encompass dinuclear metallocene compounds, i.e., compounds comprising two metallocene moieties linked by a connecting group, such as an alkenyl group resulting from an olefin metathesis reaction or a saturated version resulting from hydrogenation or derivatization.

The terms "catalyst composition," "catalyst mixture," "catalyst system," and the like, do not depend upon the actual product resulting from the contact or reaction of the components of the mixtures, the nature of the active catalytic site, or the fate of the co-catalyst, the metallocene compound, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

The terms "chemically-treated solid oxide," "activator-support," "treated solid oxide compound," and the like, are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises a calcined contact product of a solid oxide compound with an electron-withdrawing anion source compound. Mixtures or combinations of more than one solid oxide compound and/or electron-withdrawing anion source compound are contemplated. Typically, the chemically-treated solid oxide comprises at least one ionizing, acidic solid oxide compound. The terms "support" and "activator-support" are not used to imply these components are inert, and such components should not be construed as an inert component of the catalyst composition.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any structure presented also encompasses all conformational isomers, regioisomers, and stereoisomers that may arise from a particular set of substituents. The structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of number of atoms, a range of weight ratios, a range of molar ratios, a range of temperatures, a range of molecular weights, a range of melt indices, a range of densities, a range of catalyst activities, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a weight percent of a transition metal compound to a metal-containing sulfated activator-support, Applicants' intent is to disclose or claim individually every possible number that such a range could encompass, consistent with the disclosure herein. By a disclosure that the weight percent of the transition metal compound to the metal-containing activator-support is in a range from about 0.01 to about 10 percent, Applicants intend to recite that the weight percent can be selected from about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10 percent. Additionally, the weight percent can be within any range from about 0.01 to about 10 percent (for example, the weight percent is in a range from about 0.5 to about 5 percent), and this also includes any combination of ranges between about 0.01 and about 10 percent (for example, the weight percent is in a range from about 0.05 to about 1.5 percent or from about 3 to about 7 percent). Likewise, all other ranges disclosed herein should be interpreted in a manner similar to this example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The terms "a," "an," and "the" are intended to include plural alternatives, e.g., at least one, unless otherwise specified. For instance, the disclosure of "a solid oxide" or "a metallocene compound" is meant to encompass one, or mixtures or combinations of more than one, solid oxide or metallocene compound, respectively.

While compositions and methods are described in terms of "comprising" various components or steps, the compositions and methods can also "consist essentially of" or "consist of" the various components or steps. For example, a metal-containing sulfated activator-support of the present invention can comprise, or alternatively, can consist essentially of, a contact product of (i) a transition metal compound; (ii) a sulfate compound; and (iii) a solid oxide.

DETAILED DESCRIPTION OF THE INVENTION

The present invention is directed generally to metal-containing activator-supports, catalyst compositions employing these supports, methods for preparing the activator-supports and the catalyst compositions, methods for using the catalyst compositions to polymerize olefins, the polymer resins produced using such catalyst compositions, and articles produced using these polymer resins. In one aspect, the present invention relates to a metal-containing sulfated activator-support comprising a contact product of:

(i) a transition metal compound;
(ii) a sulfate compound; and
(iii) a solid oxide.

Such metal-containing sulfated activator-supports can be produced by a process which comprises the following steps:

(a) contacting a solid oxide with a sulfate compound to produce a sulfated solid oxide;
(b) calcining the sulfated solid oxide to produce a calcined sulfated solid oxide; and
(c) contacting the calcined sulfated solid oxide with
  (i) a transition metal compound and a hydrocarbon solvent; or
  (ii) a vapor comprising a transition metal compound;
to produce the metal-containing sulfated activator-support.

Alternatively, the metal-containing sulfated activator-support can be produced, for example, by a process comprising:

(a) contacting a solid oxide with a sulfate compound while calcining to produce a calcined sulfated solid oxide; and
(b) contacting the calcined sulfated solid oxide with
  (i) a transition metal compound and a hydrocarbon solvent; or
  (ii) a vapor comprising a transition metal compound;
to produce the metal-containing sulfated activator-support.

In either of these processes, a further step optionally can be employed which removes the hydrocarbon solvent from the metal-containing sulfated activator-support. The present invention also contemplates that the metal-containing sulfated activator-support does not need to be calcined prior to use in a catalyst composition and polymerization process.

Catalyst compositions of this invention generally comprise a contact product of a metallocene compound and a metal-containing sulfated activator-support. Often, the catalyst composition also contains an organoaluminum compound. Catalyst compositions disclosed herein can be used to polymerize olefins. One such process comprises contacting the catalyst composition with an olefin monomer and optionally an olefin comonomer under polymerization conditions to produce an olefin polymer, wherein the catalyst composition comprises a contact product of a metallocene compound and a metal-containing sulfated activator-support.

Olefin homopolymers, copolymers, terpolymers, and the like, can be produced using the catalyst compositions and methods for olefin polymerization disclosed herein. Articles of manufacture can comprise these polymers, or can be formed from these polymers, and are part of this invention.

Catalyst Composition

Catalyst compositions disclosed herein employ a metal-containing sulfated activator-support. According to one aspect of the present invention, a catalyst composition is provided which comprises a contact product of a metallocene compound and a metal-containing sulfated activator-support. The metal-containing sulfated activator-support comprises a contact product of:

(i) a transition metal compound;
(ii) a sulfate compound; and
(iii) a solid oxide.

This catalyst composition can further comprise an organoaluminum compound. These catalyst compositions can be utilized to produce polyolefins, for example, homopolymers, copolymers, or terpolymers, for a variety of end-use applications.

In accordance with this and other aspects of the present invention, it is contemplated that the catalyst compositions disclosed herein can contain more than one metallocene compound and/or more than one activator-support. Additionally, more than one organoaluminum compound is also contemplated.

In other aspects of this invention, optional co-catalysts can be employed. For example, a catalyst composition comprising a metallocene compound and a metal-containing sulfated activator-support can further comprise an optional co-catalyst. Suitable co-catalysts in this aspect can be selected from an aluminoxane compound, an organozinc compound, an organoboron or organoborate compound, an ionizing ionic compound, and the like, or combinations thereof. More than one co-catalyst can be present in the catalyst composition.

A catalyst composition in another aspect of the present invention comprises a contact product of a metallocene compound, a metal-containing sulfated activator-support, and an organoaluminum compound, wherein this catalyst composition is substantially free of aluminoxanes, organoboron or organoborate compounds, ionizing ionic compounds, or other similar co-catalysts. In this aspect, the catalyst composition has catalyst activity, to be discussed below, in the absence of these additional materials. For example, a catalyst composition of the present invention can consist essentially of a metallocene compound, a metal-containing sulfated activator-support, and an organoaluminum compound, wherein no other materials are present in the catalyst composition which would increase/decrease the activity of the catalyst composition more than about 10% from the catalyst activity of the catalyst composition in the absence of said materials.

In other aspects of this invention, catalyst compositions comprising a contact product of a metallocene compound and a metal-containing sulfated activator-support can further comprise additional activator-supports. For instance, the additional activator-support can be fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, and the like, or a combination of these materials.

Alternatively, catalyst compositions of the present invention can further comprise an additional activator-support which comprises a solid oxide treated with an electron-withdrawing anion, wherein the solid oxide comprises silica, alumina, silica-alumina, aluminophosphate, heteropolytungstate, titania, zirconia, magnesia, boria, zinc oxide, a mixed oxide thereof, or any combination thereof. The electron-withdrawing anion can be fluoride, chloride, bromide, phosphate, triflate, bisulfate, sulfate, and the like, or combinations thereof.

The additional activator-support employed optionally in a catalyst composition in accordance with this invention can further comprise a metal or metal ion such as, for example, zinc, titanium, nickel, vanadium, silver, copper, gallium, tin, tungsten, molybdenum, and the like, or any combination thereof.

Yet, in another aspect, catalyst compositions of the present invention can further comprise an activator-support selected from a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, and the like, or combinations of these materials. Additional activator-support materials will be discussed in more detail below.

This invention further encompasses methods of making catalyst compositions disclosed herein, such as, for example, contacting the respective catalyst components in any order or sequence.

In one aspect of the invention, the metallocene compound can be precontacted with an olefinic monomer if desired, not necessarily the olefin monomer or comonomer(s) to be polymerized, and an organoaluminum compound for a first period of time prior to contacting this precontacted mixture with an activator-support. The first period of time for contact, the precontact time, between the metallocene compound the olefinic monomer, and the organoaluminum compound typically ranges from a time period of about 0.05 hours to about 24 hours, for example, from about 0.05 hours to about 1 hour. Precontact times from about 10 minutes to about 30 minutes are also employed.

In another aspect of the invention, the metallocene compound can be precontacted with an olefinic monomer and an activator-support for a first period of time prior to contacting this precontacted mixture with an organoaluminum compound. The first period of time for contact, the precontact time, between the metallocene compound, the olefinic monomer, and the activator-support typically ranges from a time period of about 0.05 hours to about 24 hours, for example, from about 0.05 hours to about 2 hours. Precontact times from about 10 minutes to about 60 minutes are also employed.

Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (i.e., sequentially), in parallel, or a combination of these steps. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, metallocene, activator-support, organoaluminum co-catalyst, and optionally an unsaturated hydrocarbon) are contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once the precontacted mixture of the metallocene compound, olefin monomer, and organoaluminum co-catalyst is contacted with the activator-support, this composition (with the addition of the activator-support) is termed a "postcontacted mixture." The postcontacted mixture optionally remains in contact for a second period of time, the postcontact time, prior to initiating the polymerization process. Postcontact times between the precontacted mixture and the activator-support generally range from about 0.05 hours to about 24 hours. In a further aspect, the postcontact time is in a range from about 0.05 hours to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture is immobilized, adsorbed, or deposited thereon. Where heating is employed, the postcontacted mixture generally is heated to a temperature of from between about 0° F. to about 150° F., or from about 40° F. to about 95° F.

In another aspect, the metallocene, organoaluminum, and activator-support can be precontacted for a period of time prior to being contacted with the olefin(s) to be polymerized in the reactor.

According to one aspect of this invention, the molar ratio of the moles of metallocene compound to the moles of organoaluminum compound in a catalyst composition generally is in a range from about 1:1 to about 1:10,000. In another aspect, the molar ratio is in a range from about 1:1 to about 1:1,000. Yet, in another aspect, the molar ratio of the moles of metallocene compound to the moles of organoaluminum compound is in a range from about 1:1 to about 1:100. These molar ratios reflect the ratio of total moles of metallocene compound or compounds to the total amount of organoaluminum compound (or compounds) in both the precontacted mixture and the postcontacted mixture combined, if precontacting and/or postcontacting steps are employed.

When a precontacting step is used, the molar ratio of the total moles of olefin monomer to total moles of metallocene compound in the precontacted mixture is typically in a range from about 1:10 to about 100,000:1. Total moles of each component are used in this ratio to account for aspects of this invention where more than one olefin monomer and/or more than one metallocene compound are employed. Further, this molar ratio can be in a range from about 10:1 to about 1,000:1 in another aspect of the invention.

Generally, the weight ratio of organoaluminum compound to activator-support is in a range from about 10:1 to about 1:1000. If more than one organoaluminum compound and/or more than one activator-support are employed, this ratio is based on the total weight of each respective component. In another aspect, the weight ratio of the organoaluminum compound to the activator-support is in a range from about 3:1 to about 1:100, or from about 1:1 to about 1:50.

In some aspects of this invention, the weight ratio of metallocene to activator-support is in a range from about 1:1 to about 1:1,000,000. If more than one metallocene and/or more than one activator-support are employed, this ratio is based on the total weight of each respective component. In another aspect, this weight ratio is in a range from about 1:5 to about 1:100,000, or from about 1:10 to about 1:10,000. Yet, in another aspect, the weight ratio of the metallocene compound to the activator-support is in a range from about 1:20 to about 1:1000.

In yet another aspect of this invention, the concentration of the metallocene, in units of micromoles of the metallocene per gram of the activator-support, is in a range from about 0.5 to about 150. If more than one metallocene and/or more than one activator-support is employed, this ratio is based on the total weight of each respective component. In another aspect, the concentration of the metallocene, in units of micromoles of the metallocene per gram of the activator-support, is in a range from about 1 to about 120, for example, from about 5 to about 100, from about 5 to about 80, from about 5 to about 60, or from about 5 to about 40. In still another aspect, the concentration of the metallocene, in units of micromoles of the metallocene per gram of the activator-support, is in a range from about 5 to about 20.

According to some aspects of this invention, aluminoxane compounds are not required to form the catalyst composition. Thus, the polymerization can proceed in the absence of aluminoxanes. Accordingly, the present invention can use, for example, organoaluminum compounds and an activator-support in the absence of aluminoxanes. While not intending to be bound by theory, it is believed that the organoaluminum compound likely does not activate the metallocene catalyst in the same manner as an organoaluminoxane compound.

Additionally, in some aspects, organoboron and organoborate compounds are not required to form a catalyst composition of this invention. Nonetheless, aluminoxanes, organoboron or organoborate compounds, ionizing ionic compounds, or combinations thereof, optionally can be used in other catalyst compositions contemplated by and encompassed within the present invention. Hence, co-catalysts such as aluminoxanes, organozinc compounds, organoboron or organoborate compounds, ionizing ionic compounds, or combinations thereof, can be employed with the metallocene compound and activator-support, for example, either in the presence or in the absence of an organoaluminum compound.

Catalyst compositions of the present invention generally have a catalyst activity greater than about 100 grams of olefin polymer (homopolymer, copolymer, etc., as the context requires) per gram of activator-support per hour (i.e., metal-containing sulfated activator-support). This activity is abbreviated as gP/gAS/hr. In another aspect, the catalyst activity is greater than about 150, greater than about 200, or greater than about 250 gP/gAS/hr. In still another aspect, catalyst compositions of this invention are characterized by having a catalyst activity greater than about 500, greater than about 1000, or greater than about 1500 gP/gAS/hr. Yet, in another aspect, the catalyst activity is greater than about 2000 gP/gAS/hr. This activity is measured under slurry polymerization conditions using isobutane as the diluent, at a polymerization temperature of about 90° C. and a reactor pressure of about 400 psig. The reactor pressure is largely controlled by the pressure of the monomer, e.g., the ethylene pressure, but other contributors to the reactor pressure include hydrogen gas (if hydrogen is used), isobutane vapor, and comonomer gas or vapor (if a comonomer is used).

Generally, catalyst compositions of the present invention have a catalyst activity greater than about 25,000 grams of olefin polymer per gram of metallocene per hour (abbreviated gP/gMET/hr). For example, the catalyst activity can be greater than about 30,000, greater than about 40,000, or greater than about 50,000 gP/gMET/hr. In another aspect, catalyst compositions of this invention are characterized by having a catalyst activity greater than about 75,000, greater than about 100,000, or greater than about 125,000 gP/gMET/hr. In still another aspect of this invention, the catalyst activity can be greater than about 150,000, or greater than about 200,000 gP/gMET/hr. This activity is measured under slurry polymerization conditions using isobutane as the diluent, at a polymerization temperature of about 90° C. and a reactor pressure of about 400 psig.

As discussed above, any combination of the metallocene compound, the activator-support, the organoaluminum compound, and the olefin monomer, can be precontacted in some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combinations of catalyst components for a second period of time. For example, a metallocene compound, an organoaluminum compound, and 1-hexene can be used in a precontacting step for a first period of time, and this precontacted mixture then can be contacted with an activator-support to form a postcontacted mixture that is contacted for a second period of time prior to initiating the polymerization reaction. For example, the first period of time for contact, the precontact time, between any combination of the metallocene compound, the olefinic monomer, the activator-support, and the organoaluminum compound can be from about 0.05 hours to about 24 hours, from about 0.05 hours to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 0.05 hours to about 24 hours, or from about 0.1 hour to about 1 hour.

Metal-Containing Sulfated Activator-Support

A metal-containing sulfated activator-support of this invention comprises a contact product of:
(i) a transition metal compound;
(ii) a sulfate compound; and
(iii) a solid oxide.

Generally, the transition metal compound used to produce the metal-containing sulfated activator-support can be any compound which contains a transition metal from Groups 3 to 11 of the periodic table. For example, transition metal compounds containing titanium, zirconium, hafnium, vanadium, molybdenum, tungsten, iron, cobalt, nickel, copper, scandium, yttrium, lanthanum, and the like, or combinations thereof, can be employed in the present invention. In some aspects of this invention, the transition metal can be titanium, zirconium, hafnium, vanadium, nickel, or a lanthanide. The metal-containing sulfated activator-support can comprise titanium, zirconium, hafnium, or vanadium, or combinations thereof, in other aspects of this invention. Representative transition metal compounds which can be employed include, but are not limited to, $TiCl_4$, $Zr(NMe_2)_4$, $VOCl_3$, tetrabenzyl zirconium, $ZrOBuCl_3$, tetraneopentyl zirconium, $VCl_4$, $V(OBu)_2$, $V(OBu)_2Cl_2$, $VO(OBu)Cl_2$, $Ti(OBu)_2Cl_2$, $Ti(OBu)_2$ $Cl_2$, $Ti(OCHMe_2)Cl_2$, $Ti(OBu)Cl_3$, $Ti(OCHMe_2)$ $Cl_3$, $Ti(allyl)_2$, $Ti(0)$ cyclo-octadiene, $Ti(0)$ cyclo-octatetraene, $Ti(CH_2Si(CH_3)_3)_2$, bis-dimethylpentadienyl titanium, bis-dimethylpentadienyl vanadium, vanadocene, and the like, or combinations or mixtures thereof.

The amount of the transition metal compound used to prepare the metal-containing sulfated activator-support typically falls within a range from about 0.01 to about 15 weight percent, based on the weight of the metal-containing activator-support. In one aspect, the weight percent of the transition metal compound to the metal-containing sulfated activator-support is in a range from about 0.01 to about 10 percent. In other aspects, the weight percent of the transition metal compound to the metal-containing sulfated activator-support is in a range from about 0.1 to about 9 percent, from about 0.1 to about 5 percent, from about 0.1 to about 3 percent, or from about 0.3 to about 2 percent.

The solid oxide used to produce the metal-containing sulfated activator-support can comprise a solid inorganic oxide comprising oxygen and at least one element selected from Groups 2, 3, 4, 5, 6, 7, 8, 9, 10, 11, 12, 13, 14, or 15 of the periodic table, or comprising oxygen and at least one element selected from the lanthanide or actinide elements (See: Hawley's Condensed Chemical Dictionary, $11^{th}$ Ed., John Wiley & Sons, 1995; Cotton, F. A., Wilkinson, G., Murillo, C. A., and Bochmann, M., Advanced Inorganic Chemistry, $6^{th}$ Ed., Wiley-Interscience, 1999). For example, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Accordingly, suitable examples of solid oxide materials or compounds that can be used to form the metal-containing sulfated activator-support include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. This includes co-gels or co-precipitates of different solid oxide materials. In accordance with one aspect of this invention, the solid oxide comprises silica, alumina, silica-alumina, aluminophosphate, titania, zirconia, magnesia, boria, zinc oxide, any mixed oxide thereof, or any combination thereof. In another aspect, the solid oxide comprises alumina or silica, for instance, silica-alumina, aluminophosphate, or alumina. Yet, in another aspect, the solid oxide is alumina. Solid oxides which can be employed in the metal-containing sulfated activator-support, or can be used to form chemically-treated solid oxides which can be used as an optional component in a catalyst composition, are discussed in further detail below.

Solid oxides of the present invention generally have surface areas ranging from about 100 to about 1000 $m^2/g$. In some aspects, the surface area falls within a range from about 150 to about 750 $m^2/g$, for example, from about 200 to about 600 $m^2/g$. The surface area of the solid oxide can range from about 250 to about 500 $m^2/g$ in another aspect of this invention. Solid oxides having surface areas of about 300 $m^2/g$, about 350 $m^2/g$, about 400 $m^2/g$, or about 450 $m^2/g$, can be employed in this invention.

The pore volume of the solid oxide is generally greater than about 0.5 mL/g. Often, the pore volume is greater than about 0.75 mL/g, or greater than about 1 mL/g. In another aspect, the pore volume is greater than about 1.2 mL/g. In yet another aspect, the pore volume falls within a range from about 0.8 mL/g to about 1.8 mL/g, such as, for example, from about 1 mL/g to about 1.6 mL/g.

The solid oxides disclosed herein generally have average particle sizes ranging from about 10 microns to about 200 microns. In some aspects of this invention, the average particle size falls within a range from about 25 microns to about 150 microns. For example, the average particle size of the solid oxide can be in a range from about 40 to about 120 microns.

In accordance with the present invention, metal-containing sulfated activator-supports comprise a contact product of (i) a transition metal compound; (ii) a sulfate compound; and (iii) a solid oxide. The sulfate compound is an electron-withdrawing anion source compound and, correspondingly, the electron-withdrawing anion is sulfate. Illustrative and non-limiting examples of suitable sulfate compounds include $H_2SO_4$, $(NH_4)_2SO_4$, $NH_4HSO_4$, $Al_2(SO)_3$, $SO_3$ gas, organics sulfates, me (e.g., titanium, vanadium, copper, zinc, lanthanum, etc.), and the like, or a combination of these sulfate sources. Sulfuric acid and/or ammonium sulfate is/are often used as the sulfate compound.

A process of the present invention to produce a metal-containing sulfated activator-support can comprise the following steps:

(a) contacting a solid oxide with a sulfate compound to produce a sulfated solid oxide;

(b) calcining the sulfated solid oxide to produce a calcined sulfated solid oxide; and (c) contacting the calcined sulfated solid oxide with (i) a transition metal compound and a hydrocarbon solvent; or (ii) a vapor comprising a transition metal compound;

to produce the metal-containing sulfated activator-support.

Also encompassed by this invention is a metal-containing sulfated activator-support produced by this process. Prior to step (a) of this process, the solid oxide can be calcined, although this is not a requirement. If the solid oxide is calcined, the calcining is conducted typically at a temperature from about 400° C. to about 800° C. for a time period ranging from about 30 minutes to about 20 hours. In step (a), the solid oxide and the sulfate compound are contacted. For instance, the solid oxide can be alumina and the sulfate compound can be sulfuric acid or a sulfate salt, such as ammonium sulfate. The sulfated solid oxide of step (a) can be produced by forming a slurry of the solid oxide in a suitable solvent, such as alcohol or water, in which the desired concentration of the sulfating agent has been added. Suitable organic solvents include, but are not limited to, the one to three carbon alcohols because of their volatility and low surface tension. Alternatively, the solid oxide can be contacted with sulfate in the gas phase.

According to one aspect of this invention, a weight ratio of the sulfate compound to the solid oxide is in a range from about 1:100 to about 1:1. According to another aspect of this invention, the weight ratio of the sulfate compound to the solid oxide is in a range from about 1:75 to about 1:2, from about 1:50 to about 1:3, or from about 1:20 to about 1:4.

In another aspect, the ratio of the sulfate compound to the solid oxide is greater than about 0.5 mmol/g. Often, the ratio of the sulfate compound to the solid oxide is greater than about 1 mmol/g, or greater than about 1.5 mmol/g. For example, the ratio of the sulfate compound to the solid oxide can be in a range from about 1.5 mmol/g to about 10 mmol/g.

Once impregnated with sulfate, the sulfated solid oxide can be dried by any suitable method including, but not limited to, suction filtration followed by evaporation, drying under vacuum, spray drying, and the like, although it is also possible to initiate the calcining step immediately without drying. Calcining the sulfated solid oxide to produce a calcined sulfated solid oxide, step (b) above, generally is conducted in an ambient atmosphere, typically in a dry ambient atmosphere, at a temperature from about 300° C. to about 900° C., and for a time of about 1 minute to about 30 hours. Calcining can be conducted at a temperature from about 400° C. to about 800° C., or alternatively, at a temperature from about 500° C. to about 700° C. Calcining can be conducted for about 5 minutes to about 24 hours, or for about 15 minutes to about 10 hours. Thus, for example, calcining can be carried out for about 3 to about 10 hours at a temperature from about 450° C. to about 650° C. Alternatively, calcining can be conducted for about 0.5 to about 8 hours at a temperature in a range from about 500° C. to about 700° C. In another aspect, calcining can be conducted at a temperature in a range from about 350° C. to about 600° C. for a time period ranging from about 0.3 to about 20 hours. Generally, calcining is conducted in an oxidizing atmosphere, such as air or oxygen. Alternatively, an inert atmosphere, such as nitrogen or argon, or a wet atmosphere, such as steam, can be used. Additional information on calcining is provided below in the discussion of additional activator-supports.

In step (c) of this process, the transition metal is deposited onto the calcined sulfated solid oxide. In the (c)(i) alternative, the calcined sulfated solid oxide is contacted with a transition metal compound and a hydrocarbon solvent to produce the metal-containing sulfated activator-support. The calcined sulfated solid oxide can be contacted with a mixture comprising the hydrocarbon solvent and the transition metal compound, and this mixture can be a solution or a slurry. For example, this process contemplates transition metal compounds which are completely soluble, partially soluble, or completely insoluble in the hydrocarbon solvent. In another aspect, the calcined sulfated solid oxide is slurried in a hydrocarbon solvent, to which the transition metal compound is then added. Therefore, various orders of contacting the calcined sulfated solid oxide, the transition metal compound, and the hydrocarbon solvent are contemplated herein and, accordingly, all orders of additions are encompassed by this invention. It is also contemplated, for instance, that the calcined sulfated solid oxide compound is contacted with the metallocene compound prior to contacting with the transition metal compound, although often the metal-containing sulfated activator-support is formed first, and then contacted with the metallocene compound. In still another aspect, the metallocene compound and a mixture comprising a transition metal compound and a hydrocarbon solvent are continuously added to a vessel into which the calcined sulfated solid oxide is also continuously fed. After a certain contact or residence time, which can vary from one minute to several hours or more, this mixture or slurry can be fed continuously to a polymerization reactor.

Transition metal compounds which contain titanium, zirconium, hafnium, vanadium, molybdenum, tungsten, iron, cobalt, nickel, copper, scandium, yttrium, lanthanum, and the like, or combinations of transition metal compounds, can be employed in step (c) of the process. Examples of suitable hydrocarbon solvents include, but are not limited to, propane, cyclohexane, isobutane, n-butane, n-pentane, isopentane, neopentane, n-hexane, and n-heptane. In some aspects of this invention, the hydrocarbon solvent is a straight chain saturated hydrocarbon such as n-pentane, n-hexane, and n-heptane, for example.

The metal-containing sulfated activator-support produced in step (c) may be wet and, therefore, the hydrocarbon solvent optionally can be removed from the metal-containing sulfated activator-support. The optional drying step can be performed under vacuum or an inert atmosphere. Drying the metal-containing sulfated activator-support is not required, however. The metal-containing sulfated activator-support, whether wet or dry, can be utilized as a part of a catalyst composition without additional processing. For instance, the metal-containing sulfated activator-support does not need to be calcined prior to being used in a catalyst composition, for instance, to polymerize olefins. Hence, in one aspect of this invention, the metal-containing sulfated activator-support produced in step (c) is not subsequently calcined.

In the (c)(ii) alternative, the calcined sulfated solid oxide is contacted with a vapor comprising a transition metal compound to produce the metal-containing sulfated activator-support. In this aspect, the transition metal is deposited onto the calcined sulfated solid oxide in the vapor/gas phase. Often, this is accomplished by employing a transition metal compound which is available as a liquid, and injecting this liquid into a gas/vapor stream which is used to fluidize the calcined sulfated solid oxide. The liquid transition metal compound can evaporate and contact the calcined sulfated solid oxide as part of the fluidizing gas/vapor. A non-limiting example of a transition metal compound which can be contacted with the calcined sulfated solid oxide in this manner is $TiCl_4$. Temperatures employed in step (c)(ii) of this process generally fall within a range from about 25° C. to about 300° C.

Another process than can be employed to produce a metal-containing sulfated activator-support comprises:

(a) contacting a solid oxide with a sulfate compound while calcining to produce a calcined sulfated solid oxide; and (b) contacting the calcined sulfated solid oxide with (i) a transition metal compound and a hydrocarbon solvent; or (ii) a vapor comprising a transition metal compound;

to produce the metal-containing sulfated activator-support.

This invention also encompasses a metal-containing sulfated activator-support produced by this process. As with the alternate process described above, prior to step (a) of this process, the solid oxide can be calcined, but this is not a requirement. In step (a), the solid oxide and the sulfate compound can be contacted simultaneously or concurrently while calcining. Contacting can be in an aqueous solution/slurry, an anhydrous solution/slurry (e.g., in alcohol), or in the gas phase. Calcining conditions, both time and temperature, can fall within the ranges provided above.

In step (b), the calcined sulfated solid oxide is contacted with either (i) a transition metal compound and a hydrocarbon solvent, or (ii) a vapor comprising a transition metal compound, to produce the metal-containing sulfated activator-support. Representative transition metals, metal compounds, and hydrocarbon solvents provided above also can be utilized in this process. The resultant metal-containing sulfated activator-support of step (b) may be wet and, optionally, the hydrocarbon solvent can be removed from the metal-containing sulfated activator-support. The metal-containing sulfated activator-support does not need to be calcined prior to being used in a catalyst composition, and in one aspect of this invention, the metal-containing sulfated activator-support produced in step (b) is not subsequently calcined.

Metal-containing sulfated activator-supports produced in accordance with this invention generally have surface areas ranging from about 100 to about 1000 m$^2$/g. In some aspects, the surface area falls within a range from about 150 to about 750 m$^2$/g, for example, from about 200 to about 600 m$^2$/g. The surface area of the metal-containing sulfated activator-support can range from about 250 to about 500 m$^2$/g in another aspect of this invention. For instance, metal-containing sulfated activator-supports having surface areas of about 300 m$^2$/g, about 350 m$^2$/g, about 400 m$^2$/g, or about 450 m$^2$/g, can be employed in this invention.

The pore volume of the metal-containing sulfated activator-support is generally greater than about 0.5 mL/g. Often, the pore volume is greater than about 0.7 mL/g, or greater than about 1 mL/g. In another aspect, the pore volume is greater than about 1.3 mL/g. In yet another aspect, the pore volume falls within a range from about 0.8 mL/g to about 1.8 mL/g, such as, for example, from about 1 mL/g to about 1.6 mL/g.

Generally, the average pore size of the metal-containing sulfated activator-support is greater than about 50 angstroms. For instance, the average pore size can be greater than about 80, greater than about 90, or greater than about 100 angstroms. In one aspect, the average pore size is within a range from about 100 to about 200 angstroms.

The metal-containing sulfated activator-supports disclosed herein generally have average particle sizes ranging from about 5 microns to about 200 microns. In some aspects of this invention, the average particle size falls within a range from about 10 microns to about 200 microns, or from about 25 microns to about 150 microns. For example, the average particle size of metal-containing sulfated activator-support can be in a range from about 40 to about 120 microns, or from about 40 to about 80 microns.

Additional Activator-Supports

The present invention encompasses various catalyst compositions which can include a metal-containing sulfated activator-support. For example, a catalyst composition is provided which comprises a contact product of a metallocene compound and a metal-containing sulfated activator-support. The metal-containing sulfated activator-support comprises a contact product of (i) a transition metal compound; (ii) a sulfate compound; and (iii) a solid oxide.

Such catalyst compositions can further comprise an additional activator-support, such as a chemically-treated solid oxide, that is different from the metal-containing sulfated activator-support of the present invention. Alternatively, the catalyst composition can further comprise an activator-support selected from a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, and the like, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of organoaluminum compounds, aluminoxanes, organoboron compounds, ionizing ionic compounds, and the like.

Chemically-treated solid oxides comprise at least one solid oxide treated with at least one electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and the untreated solid oxide materials is by comparing the polymerization activities of the treated and the untreated oxides under acid catalyzed reactions.

Chemically-treated solid oxides of this invention are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

The pore volume and surface area of solid oxides were discussed in the preceding section. Solid oxides used to prepare an additional chemically-treated solid oxide generally have a pore volume greater than about 0.1 mL/g. According to another aspect of the present invention, the solid oxide has a pore volume greater than about 0.5 mL/g. According to yet another aspect of the present invention, the solid oxide has a pore volume greater than about 1 mL/g.

In another aspect, the solid oxide used to prepare the additional chemically-treated solid oxide has a surface area ranging from about 100 to about 1000 m$^2$/g, for example, in a range from about 200 to about 800 m$^2$/g. In still another aspect of the present invention, the solid oxide has a surface area in a range from about 250 to about 600 m$^2$/g.

In still another aspect, the optional chemically-treated solid oxide can comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used to form the additional chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $W_3$, $Y_2O_3$, ZnO, $ZrO_2$, and the like, including mixed oxides thereof, and combinations thereof For example, the solid oxide that can be used to prepare the additional chemically-treated solid oxide can be silica, alumina, silica-alumina, aluminum phosphate, heteropolytungstate, titania, zirconia, magnesia, boria, zinc oxide, mixed oxides thereof, or any combination thereof.

Solid oxides of this invention, which can be used to prepare additional chemically-treated solid oxides, encompass oxide materials such as alumina, "mixed oxide" compounds thereof such as silica-alumina, and combinations and mixtures thereof. The mixed oxides such as silica-alumina can be single or multiple chemical phases with more than one metal combined with oxygen to form a solid oxide. Examples of mixed oxides that can be used in the additional, optional activator-support of the present invention include, but are not limited to, silica-alumina, silica-titania, silica-zirconia, zeolites, various clay minerals, alumina-titania, alumina-zirconia, zinc-aluminate, and the like.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present invention, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, and the like, including mixtures and combinations thereof. In addition, other ionic or non-ionic compounds that serve as sources for these electron-withdrawing anions also can be employed in the present invention.

Thus, for example, the additional chemically-treated solid oxide optionally used in the catalyst compositions of the present invention can be fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, and the like, or combinations thereof.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this invention is employing two or more electron-withdrawing anion source compounds in two or more separate contacting steps.

Thus, one example of such a process by which a chemically-treated solid oxide is prepared is as follows: a selected solid oxide, or combination of oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds are either the same or different compounds.

According to another aspect of the present invention, the additional chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Non-limiting examples of the metal or metal ion include zinc, nickel, vanadium, titanium, silver, copper, gallium, tin, tungsten, molybdenum, and the like, or combinations thereof.

Various processes are used to form chemically-treated solid oxides useful in the present invention. The chemically-treated solid oxide can comprise the contact product of a solid oxide and an electron-withdrawing anion source. It is not required that the solid oxide be calcined prior to contacting the electron-withdrawing anion source. The contact product typically is calcined either during or after the solid oxide compound is contacted with the electron-withdrawing anion source. The solid oxide can be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

The method by which the solid oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide and electron-withdrawing anion is calcined.

The optional solid oxide activator-support (i.e., chemically-treated solid oxide) thus can be produced by a process comprising:

1) contacting a solid oxide with an electron-withdrawing anion source compound to form a first mixture; and 2) calcining the first mixture to form the solid oxide activator-support.

According to another aspect of the present invention, the solid oxide activator-support (chemically-treated solid oxide) is produced by a process comprising:

1) contacting a solid oxide with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present invention, the chemically-treated solid oxide is produced or formed by contacting the solid oxide with the electron-withdrawing anion source compound, where the solid oxide compound is calcined before, during, or after contacting the electron-withdrawing anion source.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature from about 300° C. to about 800° C., or alternatively, at a temperature from about 400° C. to about 700° C. Calcining can be conducted for about 30 minutes to about 50 hours, or for about 1 hour to about 15 hours. Thus, for example, calcining can be carried out for about 3 to about 10 hours at a temperature from about 350° C. to about 550° C. Any suitable ambient atmosphere can be employed during calcining. Generally, calcining is conducted in an oxidizing atmosphere, such as air or oxygen. Alternatively, an inert atmosphere, such as nitrogen or argon, or a reducing atmosphere, such as hydrogen or carbon monoxide, can be used.

According to one aspect of the present invention, the solid oxide material is treated with a source of halide ion, sulfate ion, or a combination of anions, and then calcined to provide the chemically-treated solid oxide in the form of a particulate solid. For example, the solid oxide material is treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Exemplary additional, or optional, activator-supports that can be employed in catalyst compositions of the present invention include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia; a pillared clay, such as a pillared montmorillonite, optionally treated with fluoride, chloride, or sulfate; phosphated alumina or other aluminophosphates optionally treated with sulfate, fluoride, or chloride; or any combination of the above.

A chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable organic or aqueous solvent, such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), analogs thereof, and combinations thereof. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention include, but are not limited to, freons, perfluorohexane, perfluorobenzene, fluoromethane, trifluoroethanol, an the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining. Silicon tetrafluoride ($SiF_4$) and compounds containing tetrafluoroborate ($BF_4^-$) can also be employed. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used. For example, volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where weight percent is based on the weight of the solid oxide, for example, silica-alumina, before calcining. According to another aspect of this invention, the amount of fluoride or chloride ion present before calcining the solid oxide is from about 1 to about 25% by weight, from about 2 to about 15%, or from about 3% to about 12% by weight. According to yet another aspect of this invention, the amount of fluoride or chloride ion present before calcining the solid oxide is from about 5 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina which can be used in the present invention typically has an alumina content from about 5% to about 95% by weight. According to one aspect of this invention, the alumina content of the silica-alumina is from about 5% to about 50%, or from about 8% to about 30%, alumina by weight. In another aspect, high alumina content silica-alumina compounds can be employed, in which the alumina content of these silica-alumina compounds typically ranges from about 60% to about 90%, or from about 65% to about 80%, alumina by weight. According to yet another aspect of this invention, the solid oxide component comprises alumina without silica, and according to another aspect of this invention, the solid oxide component comprises silica without alumina.

A sulfated solid oxide comprises sulfate and a solid oxide component, such as alumina or silica-alumina, in the form of a particulate solid. According to one aspect of the present invention, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this invention, the amount of sulfate ion present before calcining is from about 0.5 to about 100 parts by weight sulfate ion to about 100 parts by weight solid oxide. According to another aspect of this invention, the amount of sulfate ion present before calcining is from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present invention, the catalyst composition further comprises an ion-exchangeable activator-support, including but not limited to silicate and aluminosilicate compounds or minerals, either with layered or non-layered structures, and combinations thereof. In another aspect of this invention, ion-exchangeable, layered aluminosilicates such as pillared clays are used as optional activator-supports. The ion-exchangeable activator-support optionally can be treated with at least one electron-withdrawing anion such as those disclosed herein, though typically the ion-exchangeable activator-support is not treated with an electron-withdrawing anion.

According to another aspect of the present invention, the catalyst composition further comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present invention, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present invention, the additional activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-supports used to prepare the catalyst compositions of the present invention can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, co-precipitated silica/titania, mixtures thereof, or any combination thereof.

Metallocene Compounds

The metal-containing sulfated activator-supports of the present invention can be employed in a catalyst composition with one or more metallocene compounds. Generally, there is no limitation on the selection of the metallocene compound that can be used in combination with the metal-containing sulfated activator-supports of the present invention. Often, the transition metal in the metallocene compound is Ti, Zr, or Hf. Some examples of suitable ansa-metallocene compounds include, but are not limited to:

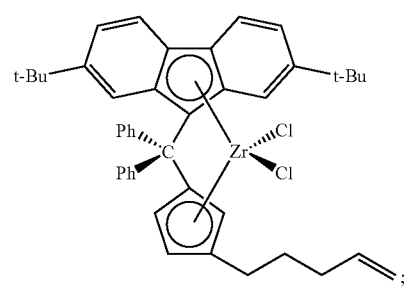

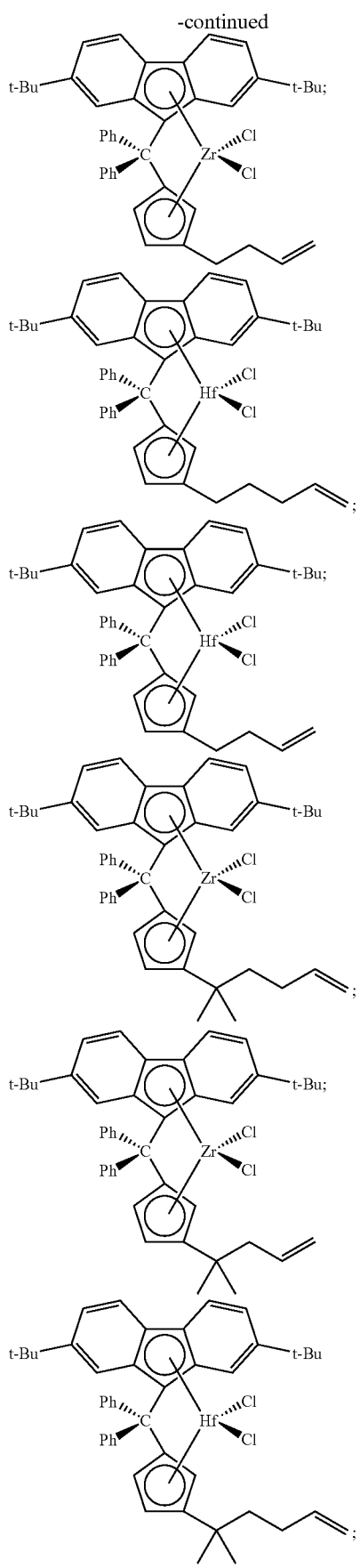

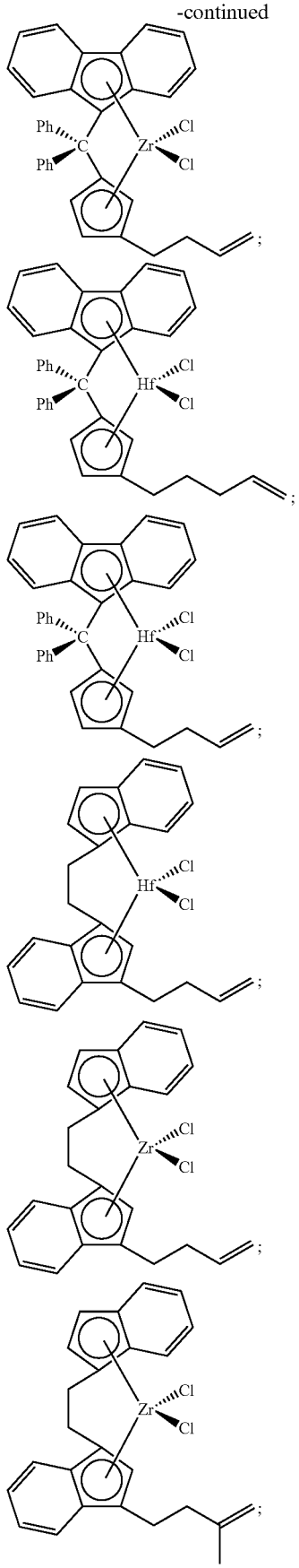
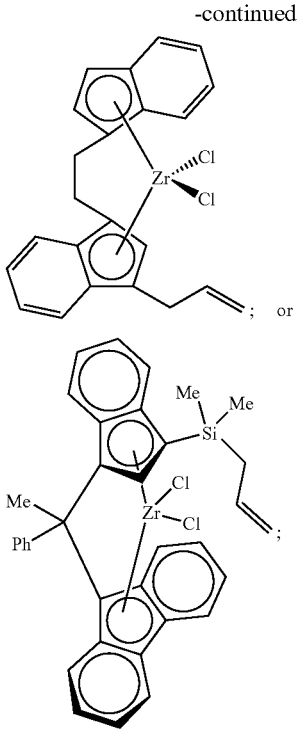
and the like. Applicants have used the abbreviations Ph for phenyl, Me for methyl, and t-Bu for tert-butyl.
The following representative bridged metallocene compounds also can be employed in catalyst compositions of the present invention:
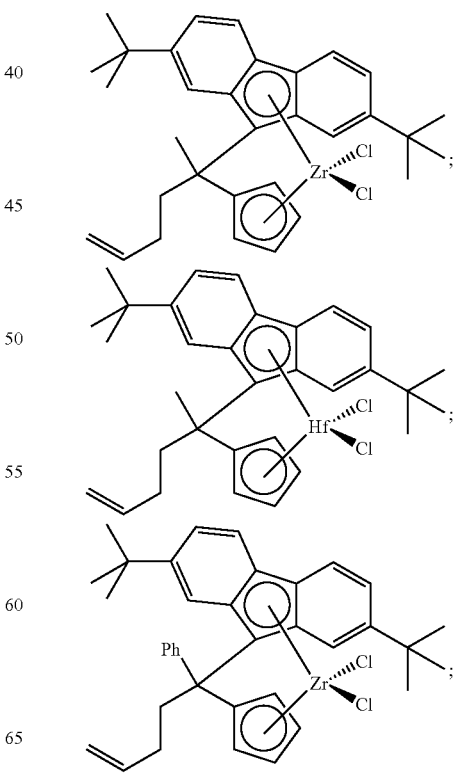

-continued
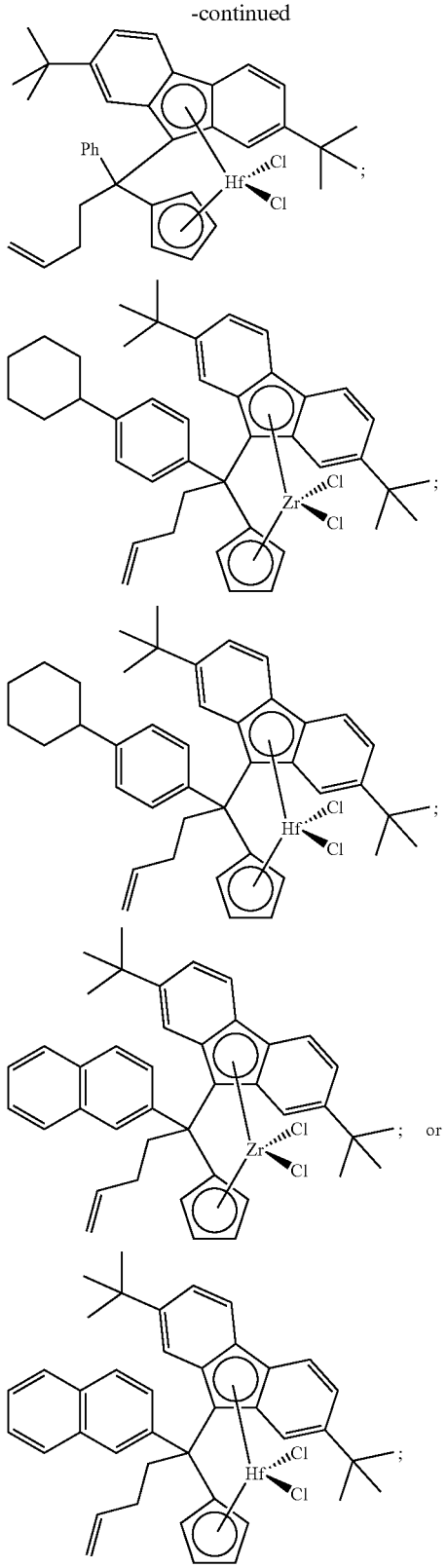
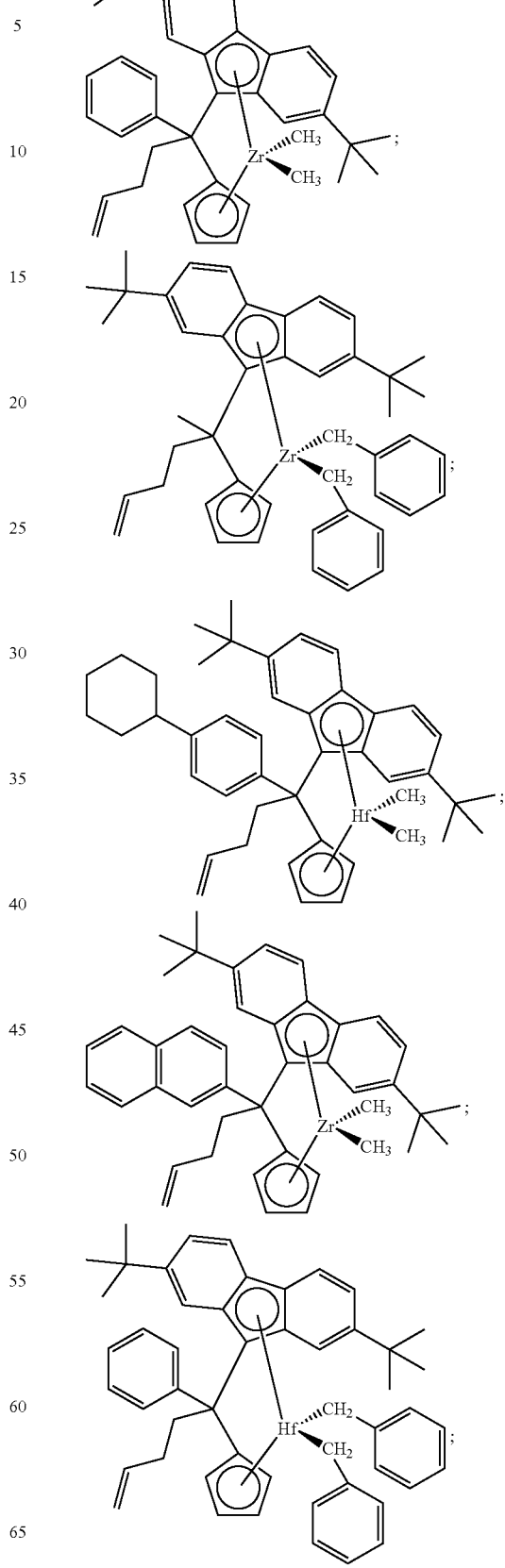
and the like.
Additional examples of metallocene compounds that are suitable for use in catalyst compositions of the present invention are contemplated. These include, but are not limited to:

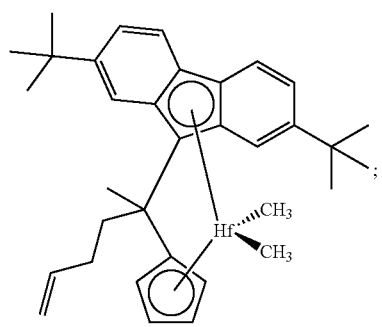
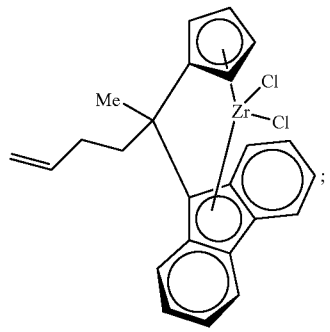
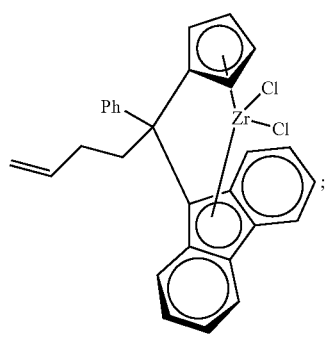
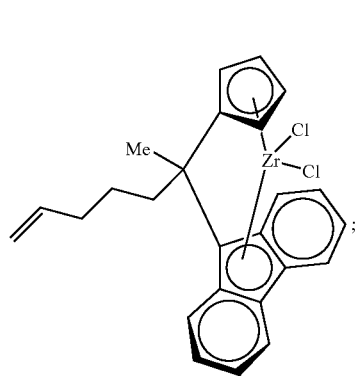
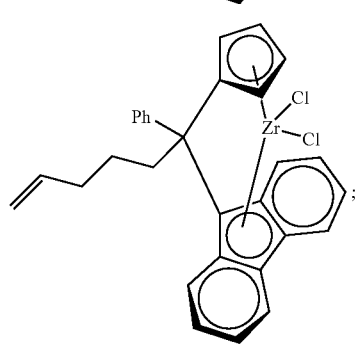
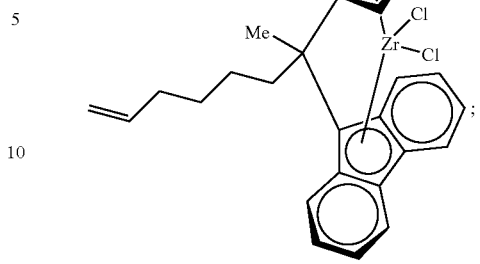
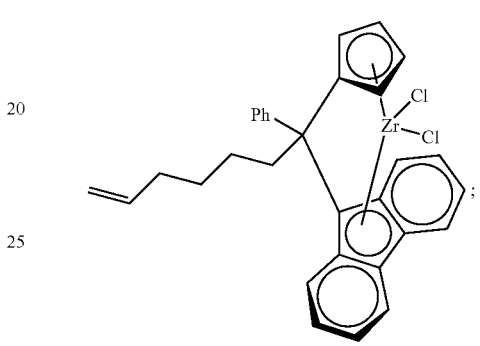
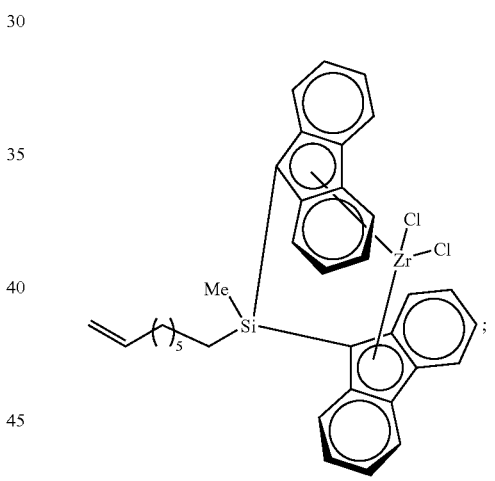
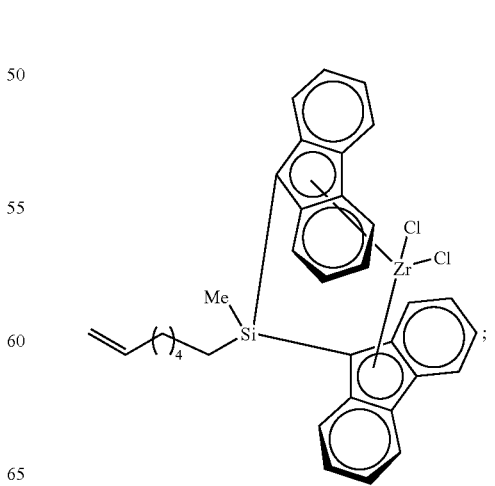

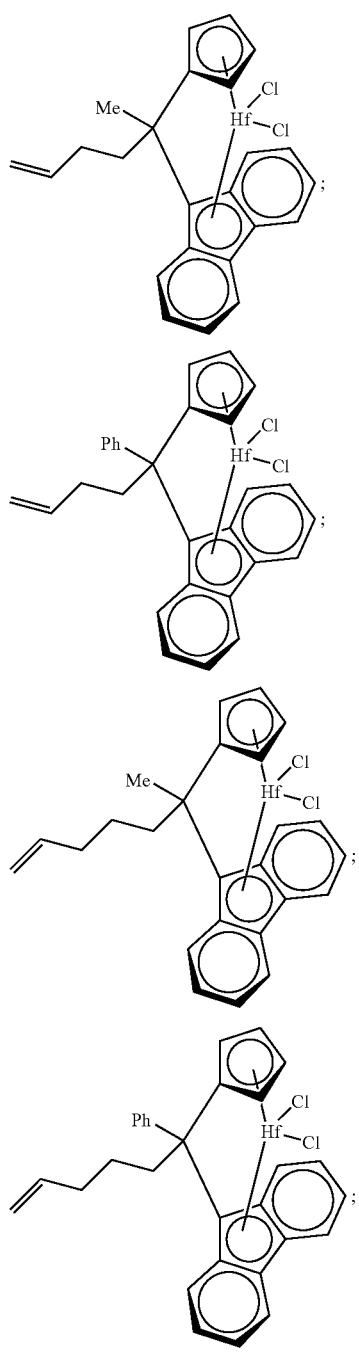
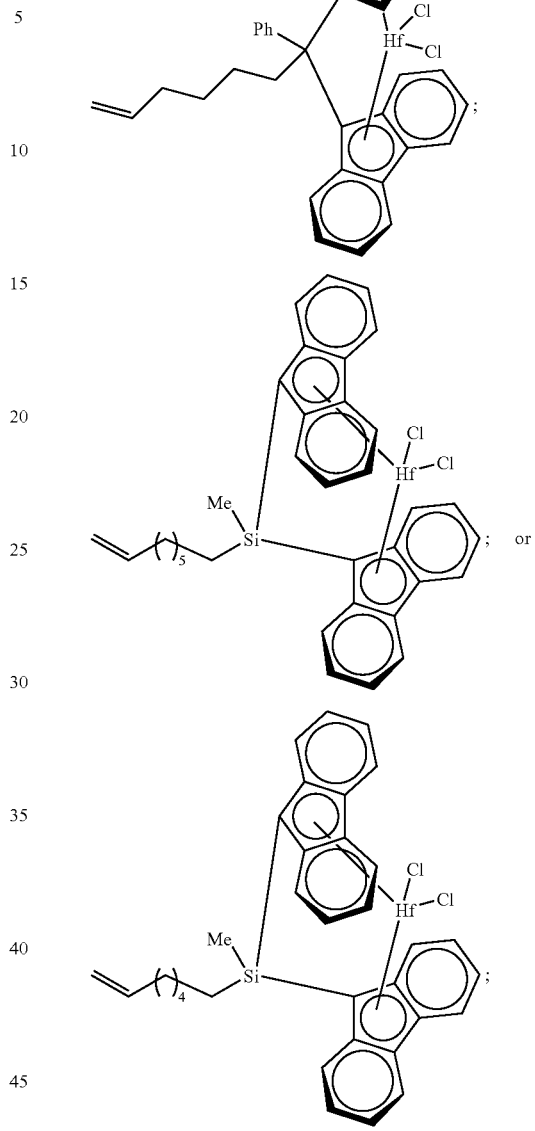
and the like.
The following non-limiting examples of two-carbon bridged metallocene compounds also can be used in catalyst compositions of the present invention:
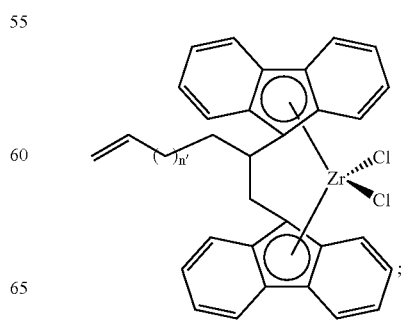

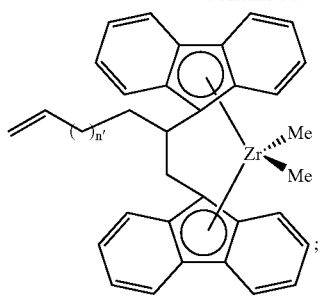
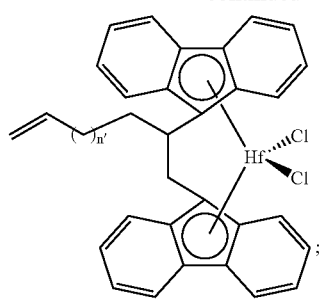
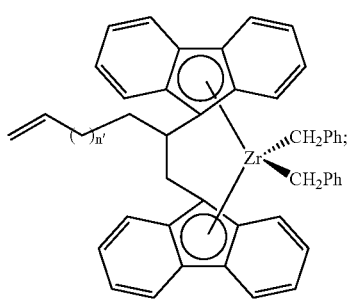
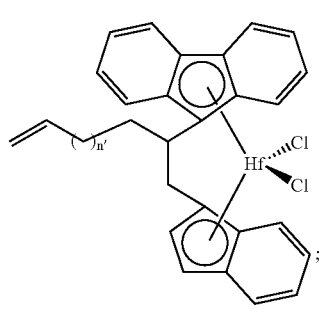
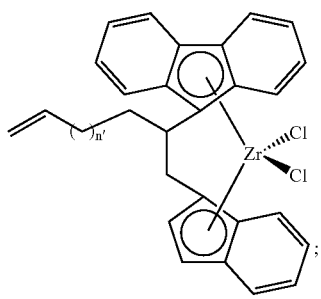
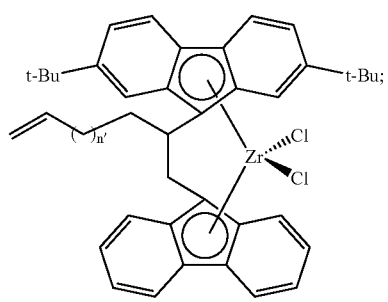
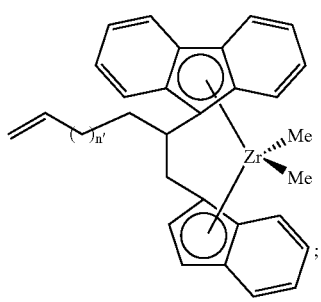
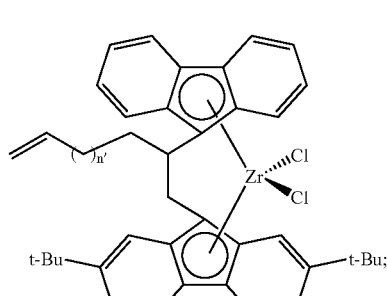
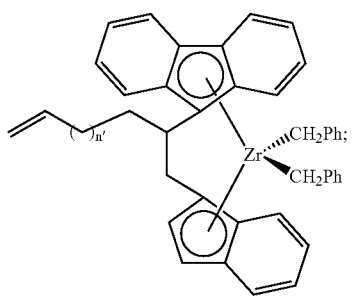
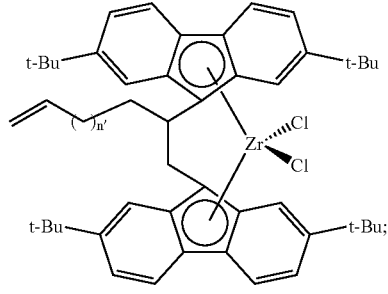

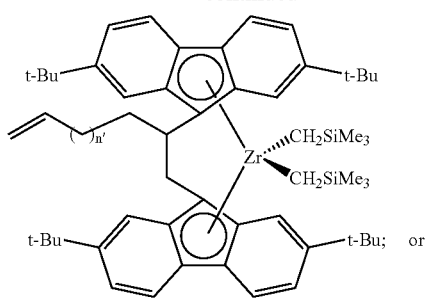

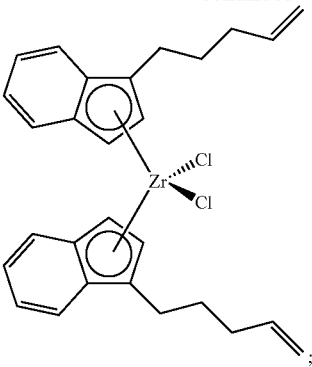

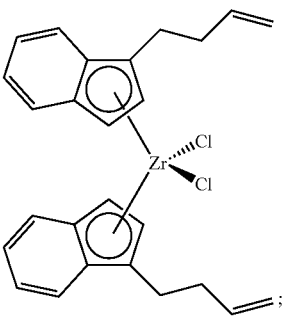

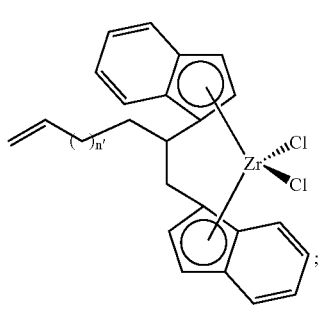

and the like. The integer n' in these metallocene compounds generally ranges from 0 to about 10, inclusive. For example, n' can be 1, 2, 3, 4, 5, 6, 7, or 8.

Other bridged metallocene compounds can be employed in catalyst compositions of the present invention. Therefore, the scope of the present invention is not limited to the bridged metallocene species provided above.

Likewise, unbridged metallocene compounds can be used in accordance with the present invention. Such compounds include, but are not limited to:

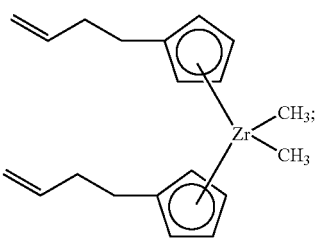

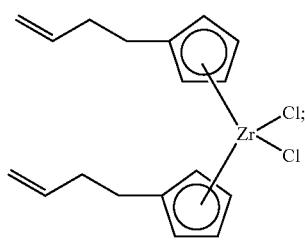

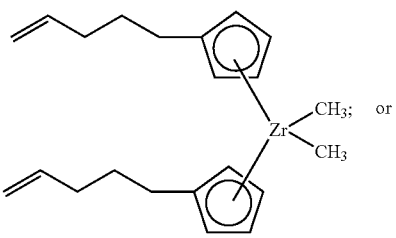

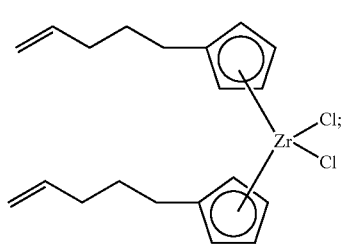

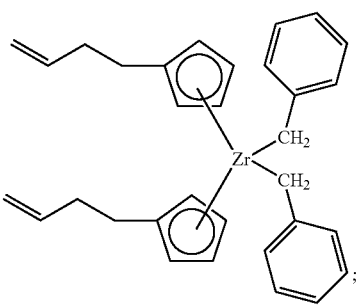

and the like.

Additional suitable unbridged metallocene compounds include, but are not limited to, the following compounds:

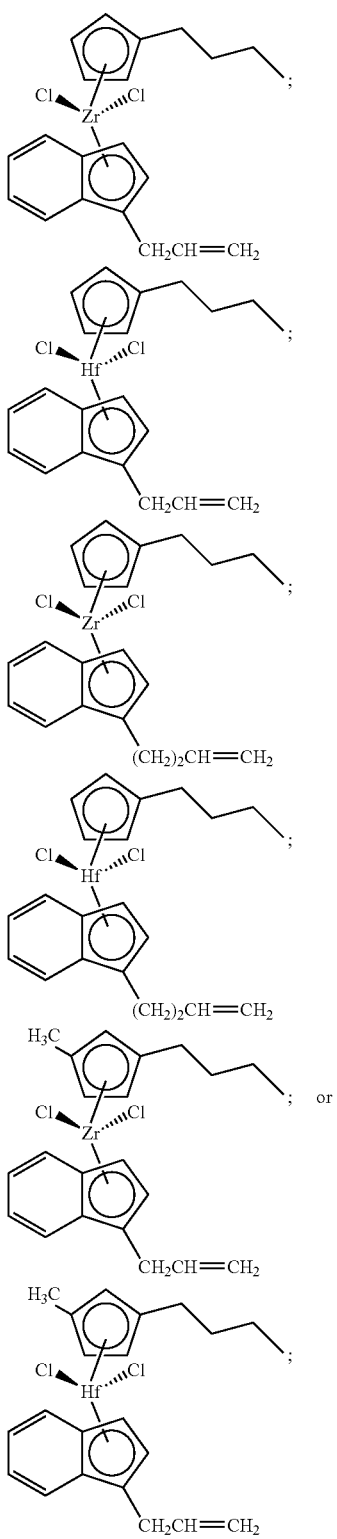

and the like.

Other unbridged metallocene compounds can be employed in catalyst compositions of the present invention. Therefore, the scope of the present invention is not limited to the unbridged metallocene species provided above. Other metallocene compounds, including half-sandwich and cyclodienyl compounds, are suitable for use in catalyst compositions of the present invention, and such compounds include, but are not limited to, the following:

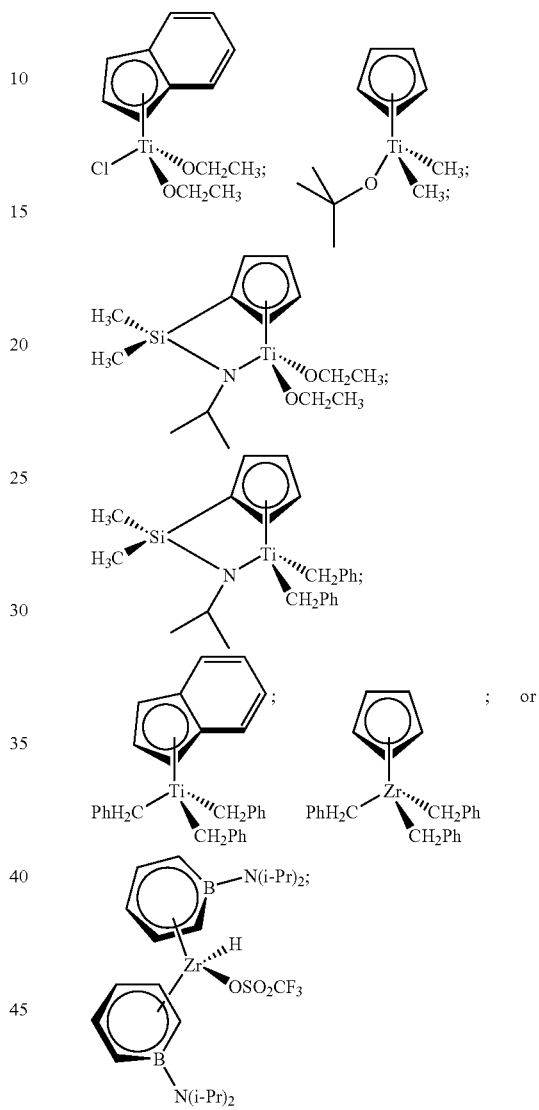

and the like, wherein i-Pr is an abbreviation for isopropyl.

Organoaluminum Compounds

In one aspect, catalyst compositions of the present invention can comprise organoaluminum compounds. Such compounds include, but are not limited to, compounds having the formula:

$(R^1)_3Al;$ where $R^1$ is an aliphatic group having from 2 to 10 carbon atoms. For example, $R^1$ can be ethyl, propyl, butyl, hexyl, or isobutyl.

Other organoaluminum compounds which can be used in catalyst compositions disclosed herein can include, but are not limited to, compounds having the formula:

$Al(X^1)_m(X^2)_{3-m},$ where $X^1$ is a hydrocarbyl; $X^2$ is an alkoxide or an aryloxide, a halide, or a hydride; and m is from 1 to 3, inclusive. The term "hydrocarbyl" is used herein to specify a hydrocarbon radical group and includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, or heteroatom substituted derivatives thereof.

In one aspect, $X^1$ is a hydrocarbyl having from 1 to about 20 carbon atoms. In another aspect of the present invention, $X^1$ is an alkyl having from 1 to 10 carbon atoms. For example, $X^1$ can be ethyl, propyl, n-butyl, sec-butyl, isobutyl, or hexyl, and the like, in yet another aspect of the present invention.

According to one aspect of the present invention, $X^2$ is an alkoxide or an aryloxide, any one of which has from 1 to 20 carbon atoms, a halide, or a hydride. In another aspect of the present invention, $X^2$ is selected independently from fluorine or chlorine. Yet, in another aspect, $X^2$ is chlorine.

In the formula, $Al(X^1)_m(X^2)_{3-m}$, m is a number from 1 to 3, inclusive, and typically, m is 3. The value of m is not restricted to be an integer; therefore, this formula includes sesquihalide compounds or other organoaluminum cluster compounds.

Examples of organoaluminum compounds suitable for use in accordance with the present invention include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a metallocene compound with an organoaluminum compound and an olefin monomer to form a precontacted mixture, prior to contacting this precontacted mixture with an activator-support to form a catalyst composition. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components are contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

The present invention further provides a catalyst composition which can comprise an aluminoxane compound. As used herein, the term "aluminoxane" refers to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon compound solvent, though any solvent that is substantially inert to the reactants, intermediates, and products of the activation step can be used. The catalyst composition formed in this manner is collected by any suitable method, for example, by filtration. Alternatively, the catalyst composition is introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

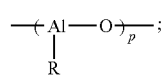

wherein R is a linear or branched alkyl having from 1 to 10 carbon atoms, and p is an integer from 3 to 20, are encompassed by this invention. The AlRO moiety shown here also constitutes the repeating unit in a linear aluminoxane. Thus, linear aluminoxanes having the formula:

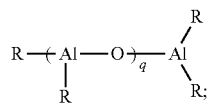

wherein R is a linear or branched alkyl having from 1 to 10 carbon atoms, and q is an integer from 1 to 50, are also encompassed by this invention.

Further, aluminoxanes can have cage structures of the formula $R^t_{5r+\alpha}R^b_{r-\alpha}Al_{4r}O_{3r}$, wherein $R^t$ is a terminal linear or branched alkyl group having from 1 to 10 carbon atoms; $R^b$ is a bridging linear or branched alkyl group having from 1 to 10 carbon atoms; r is 3 or 4; and α is equal to $n_{Al(3)} - n_{O(2)} + n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention are represented generally by formulas such as $(R-Al-O)_p$, $R(R-Al-O)_q AlR_2$, and the like. In these formulas, the R group is typically a linear or branched $C_1-C_6$ alkyl, such as methyl, ethyl, propyl, butyl, pentyl, or hexyl. Examples of aluminoxane compounds that can be used in accordance with the present invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas (R—Al—O)$_p$ and R(R—Al—O)$_q$AlR$_2$, respectively. In some aspects, p and q are at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene compound (or compounds) in the composition is generally between about 1:10 and about 100,000:1. In another aspect, the molar ratio is in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as (R$^1$)$_3$Al, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as (R$^1$)$_3$Al with a hydrated salt, such as hydrated copper sulfate, in an inert organic solvent.

Organoboron/Organoborate Compounds

According to another aspect of the present invention, the catalyst composition can comprise an organoboron or organoborate activator. Organoboron or organoborate compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used in the present invention include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal or metallocene compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene compound (or compounds) in the catalyst composition is in a range from about 0.1:1 to about 15:1. Typically, the amount of the fluoroorgano boron or fluoroorgano borate compound used is from about 0.5 moles to about 10 moles of boron/borate compound per mole of metallocene compound. According to another aspect of this invention, the amount of fluoroorgano boron or fluoroorgano borate compound is from about 0.8 moles to about 5 moles of boron/borate compound per mole of metallocene compound.

Ionizing Ionic Compounds

The present invention further provides a catalyst composition which can comprise an ionizing ionic compound. An ionizing ionic compound is an ionic compound that can function as an activator or co-catalyst to enhance the activity of the catalyst composition. While not intending to be bound by theory, it is believed that the ionizing ionic compound is capable of reacting with a metallocene compound and converting the metallocene into one or more cationic metallocene compounds, or incipient cationic metallocene compounds. Again, while not intending to be bound by theory, it is believed that the ionizing ionic compound can function as an ionizing compound by completely or partially extracting an anionic ligand, possibly a non-alkadienyl ligand from the metallocene. However, the ionizing ionic compound is an activator regardless of whether it ionizes the metallocene, abstracts a ligand in a fashion as to form an ion pair, weakens the metal-ligand bond in the metallocene, simply coordinates to a ligand, or activates the metallocene compound by some other mechanism.

Further, it is not necessary that the ionizing ionic compound activate the metallocene compound(s) only. The activation function of the ionizing ionic compound can be evident in the enhanced activity of catalyst composition as a whole, as compared to a catalyst composition that does not contain an ionizing ionic compound.

Examples of ionizing ionic compounds include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoro-methyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl) aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis(3,5-dimethylphenyl) aluminate, potassium tetrafluoroaluminate, and the like, or combinations thereof Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Olefin Monomers

Unsaturated reactants that can be employed with catalyst compositions and polymerization processes of this invention typically include olefin compounds having from about 2 to 30 carbon atoms per molecule and having at least one olefinic double bond.

This invention encompasses homopolymerization processes using a single olefin such as ethylene or propylene, as well as copolymerization, terpolymerization, etc., reactions with at least one different olefinic compound. For example, the resultant ethylene copolymers, terpolymers, etc., generally contain a major amount of ethylene (>50 mole percent) and a minor amount of comonomer (<50 mole percent), though this is not a requirement. Comonomers that can be copolymerized with ethylene often have from 3 to 20 carbon atoms in their molecular chain.

Acyclic, cyclic, polycyclic, terminal ($\alpha$), internal, linear, branched, substituted, unsubstituted, functionalized, and non-functionalized olefins can be employed in this invention. For example, typical unsaturated compounds that can be polymerized with the catalyst compositions of this invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described above. Styrene can also be employed as a monomer in the present invention.

When a copolymer (or alternatively, a terpolymer) is desired, the olefin monomer can comprise, for example, ethylene or propylene, which is copolymerized with at least one comonomer. According to one aspect of this invention, the olefin monomer in the polymerization process is ethylene. In this aspect, examples of suitable olefin comonomers include, but are not limited to, propylene, 2-methylpropene, 1-butene, 2-butene, 3-methyl-1-butene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the comonomer is 1-butene, 1-pentene, 1-hexene, 1-octene, 1-decene, or styrene, or any combination thereof.

Generally, the amount of comonomer introduced into a reactor zone to produce the copolymer is from about 0.01 to about 50 weight percent of the comonomer based on the total weight of the monomer and comonomer. According to another aspect of the present invention, the amount of comonomer introduced into a reactor zone is from about 0.01 to about 40 weight percent comonomer based on the total weight of the monomer and comonomer. In still another aspect, the amount of comonomer introduced into a reactor zone is from about 0.1 to about 35 weight percent comonomer based on the total weight of the monomer and comonomer. Yet, in another aspect, the amount of comonomer introduced into a reactor zone is from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, one monomer/reactant is ethylene, so the polymerizations are either a homopolymerization involving only ethylene, or copolymerizations with a different acyclic, cyclic, terminal, internal, linear, branched, substituted, or unsubstituted olefin. In addition, the catalyst compositions and processes of this invention can be used in the polymerization of diolefin compounds including, but not limited to, 1,3-butadiene, isoprene, 1,4-pentadiene, and 1,5-hexadiene.

Polymerization Process

Catalyst compositions of the present invention can be used to polymerize olefins to form copolymers, terpolymers, and the like. One such process for polymerizing olefins in the presence of a catalyst composition comprises contacting the catalyst composition with an olefin monomer and optionally an olefin comonomer under polymerization conditions to produce an olefin polymer, wherein the catalyst composition comprises a contact product of a metallocene compound and a metal-containing sulfated activator-support. The metal-containing sulfated activator-support comprises a contact product of (i) a transition metal compound; (ii) a sulfate compound; and (iii) a solid oxide.

Often, a catalyst composition of the present invention, employed in a polymerization process, will further comprise at least one organoaluminum compound. Suitable organoaluminum compounds include, but are not limited to, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or any combination thereof.

The catalyst compositions of the present invention are intended for any olefin polymerization method using various types of polymerization reactors. As used herein, "polymerization reactor" includes any polymerization reactor capable of polymerizing olefin monomers and comonomers (one or more than one comonomer) to produce homopolymers, copolymers, terpolymers, and the like. The various types of reactors include those that may be referred to as batch, slurry, gas phase, solution, high pressure, tubular, or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of unreacted monomer, unreacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas phase reactors, a combination of loop and gas phase reactors, multiple high pressure reactors, or a combination of high pressure with loop and/or gas phase reactors. The multiple reactors may be operated in series or in parallel.

According to one aspect of the invention, the polymerization reactor system may comprise at least one loop slurry reactor comprising vertical or horizontal loops. Monomer, diluent, catalyst, and optionally any comonomer may be continuously fed to a loop reactor where polymerization occurs. Generally, continuous processes may comprise the continuous introduction of monomer/comonomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer/comonomer are contacted with the catalyst composition by suitable stirring or other means. A carrier comprising an inert organic diluent or excess monomer may be employed. If desired, the monomer/comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide desired polymer properties include temperature, pressure, and the concentrations of various reactants. Polymerization temperature can affect catalyst productivity, polymer molecular weight, and molecular weight distribution. Suitable polymerization temperature may be any temperature below the de-polymerization temperature according to the Gibbs Free energy equations Typically, this includes from about 60° C. to about 280° C., for example, or from about 60° C. to about 110° C., depending upon the type of polymerization reactor. In some reactor systems, the polymerization temperature generally is within a range from about 70° C. to about 90° C., or from about 75° C. to about 85° C.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

According to one aspect of this invention, the feed ratio of hydrogen to the olefin monomer in the polymerization process is controlled. This weight ratio can range from about 0 ppm to about 10,000 ppm of hydrogen, based on the weight of the olefin monomer. For instance, the reactant or feed ratio of hydrogen to olefin monomer can be controlled at a weight ratio which falls within a range from about 50 ppm to about 7500 ppm, from about 50 ppm to about 5000 ppm, or from about 50 ppm to about 1000 ppm.

In ethylene polymerizations, the feed ratio of hydrogen to ethylene monomer, irrespective of comonomer(s) employed, generally is controlled at a weight ratio within a range from about 0 ppm to about 1000 ppm, but the specific weight ratio target can depend upon the desired polymer molecular weight or melt index (MI). For ethylene polymers (copolymers, terpolymers, etc.) having a MI around 1 g/10 min, the weight ratio of hydrogen to ethylene is typically in a range from about 50 ppm to about 250 ppm, such as, for example, from about 75 ppm to about 225 ppm, or from about 100 ppm to about 200 ppm.

Yet, in another aspect, effluent flush gas from the polymerization reactors disclosed herein generally has a hydrogen to olefin monomer molar ratio of less than about 0.01, although this ratio can depend upon the desired polymer molecular weight, melt index, etc. In an ethylene polymerization, the hydrogen:ethylene molar ratio is typically less than about 0.01, and often, less than about 0.005.

The polymerization process disclosed herein can be conducted in a single reactor in certain aspects of this invention. Thus, multiple reactor systems are not required. An olefin polymer (e.g., an ethylene copolymer) can be produced in the presence of hydrogen and a metallocene-based catalyst system, in a single reactor, resulting in a polymer with a ratio of Mz/Mw greater than about 3. Further, the single reactor can be, as discussed above, a gas phase reactor, a loop reactor, or a stirred tank reactor, for example.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to the polymers produced by any of the polymerization processes disclosed herein. Articles of manufacture can be formed from, and can comprise, the polymers produced in accordance with this invention.

Polymers and Articles

If the resultant polymer produced in accordance with the present invention is, for example, a polymer or copolymer of ethylene, its properties can be characterized by various analytical techniques known and used in the polyolefin industry. Articles of manufacture can be formed from, and can comprise, the ethylene polymers of this invention, whose typical properties are provided below.

Polymers of ethylene (copolymers, terpolymers, etc.) produced in accordance with this invention generally have a melt index from about 0.001 to about 10 g/10 min. Melt indices in the range from about 0.001 to about 5 g/10 min, or from about 0.01 to about 3 g/10 min, are contemplated in some aspects of this invention. For example, a polymer of the present invention can have a melt index in a range from about 0.05 to about 3, from about 0.1 to about 2, or from about 0.5 to about 1.5 g/10 min.

The density of ethylene-based polymers produced using a metal-containing sulfated activator-support disclosed herein typically falls within the range from about 0.88 to about 0.97 g/cm$^3$. In one aspect of this invention, the density of an ethylene polymer is in a range from about 0.90 to about 0.94 g/cm$^3$. Yet, in another aspect, the density is in a range from about 0.91 to about 0.93 g/cm$^3$, such as, for example, from about 0.915 to about 0.925 g/cm$^3$.

Ethylene polymers, such as copolymers and terpolymers, within the scope of the present invention generally have a number-average molecular weight (Mn) in a range from about 60,000 to about 350,000 g/mol, a weight-average molecular weight (Mw) in a range from about 100,000 to about 2,000,000 g/mol, and a z-average molecular weight (Mz) in a range from about 1,000,000 to about 5,000,000 g/mol. The ratio of Mz/Mw for the polymers of this invention often are greater than about 3, such as, for example, greater than about 3.5, or greater than about 4. In some aspects, the ratio of Mz/Mw falls within a range from about 3 to about 5.

The molecular weight distribution can be considered to consist of two components, one being a typical unimodal, bell-shaped curve, and the other being the high molecular weight tail, generally believed to result from the metal-containing sulfated activator-support. Based on the total weight of polymer, the weight fraction of the high molecular weight tail can fall within a range from about 1 to about 25 percent, or from about 1 to about 15 percent. In some aspects of this invention, the weight fraction of polymer in the high molecular weight tail is in a range from about 1 to about 10 percent. The Mw of the high molecular weight tail can be a high as 2,500,000 g/mol, or more. For instance, the Mw of the high molecular weight tail can be greater than about 3,000,000, or greater than about 3,500,000 g/mol.

By far the largest weight fraction of the polymer is encompassed by the typical bell-shaped molecular weight distribution curve. One measure of the breadth of the molecular weight distribution of this portion of the polymer is the polydispersity index, or the ratio of Mw/Mn. Generally, the ratios of Mw/Mn for this fraction of the polymer are in a range from about 2 to about 6. In some aspects, this Mw/Mn ratio is in a range from about 2 to about 4, or from about 2 to about 3. The peak molecular weight for this fraction of the polymer is generally less than about 500,000 g/mol, for example, less than about 400,000 g/mol, less than about 200,000 g/mol, or less than about 100,000 g/mol. It is also believed that the Carreau-Yasuda breadth parameter (CY-a) for this portion of the polymer is greater than about 0.3, greater than about 0.4, or greater than about 0.5. Details on the significance and interpretation of the Carreau-Yasuda empirical model may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

Due to the high molecular weight tail, it is contemplated that the increase in the ratio of Mz/Mw due to the presence of the high molecular weight tail, as compared to a standard bell-shaped profile, is greater than about 50%. For instance, the ratio of Mz/Mw can be increased by about 75% or more, or by about 100% or more, due to the incorporation of a metal-containing sulfated activator-support in the catalyst system. The high molecular weight tail also can have much less long chain branching than the portion of the polymer represented by the traditional bell-shaped curve. Often, the amount of long chain branching in the high molecular weight tail is less than ½, or less than ⅓, or less than ¼, of that found in the other portion of the polymer.

In the overall molecular weight distribution of the polymer, the weight percent of the total polymer having a molecular weight greater than 3,000,000 g/mol is generally from about 0.5 to about 20 percent, or from about 1 to about 15 percent. That is, the weight percent of the polymer having a molecular weight greater than 3,000,000 g/mol can be in a range from about 2 to about 10 percent, or from about 3 to about 8 percent. Additionally, the weight percent of the total polymer having a molecular weight greater than 1,000,000 g/mol can be from about 4.5 to about 50 percent. In some aspects, the weight percent of the polymer having a molecular weight greater than 1,000,000 g/mol is in a range from about 4.5 to about 35 percent, from about 4.5 to about 30 percent, from about 5 to about 25 percent, or from about 6 to about 20 percent.

Polymers of ethylene, whether copolymers, terpolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8×300 mm) and were calibrated with a broad linear polyethylene standard (Phillips Marlex® BHB 5003) for which the molecular weight had been determined.

Ethylene was polymerization grade ethylene obtained from Air Gas Specialty Gases. This ethylene was then further purified through a column of ¼-inch beads of Alcoa A201 alumina, activated at about 250° C. in nitrogen. Isobutane was polymerization grade obtained from Enterprise Products, which was further purified by distillation and then also passed through a column of ¼-inch beads of Alcoa A201 alumina, activated at about 250° C. in nitrogen. Triisobutylaluminum (TIBA) was obtained from Akzo Corporation as a one molar solution in heptane.

The fluorided silica-alumina employed in Examples 6 and 14 was prepared in accordance with the following procedure. A silica-alumina was obtained from W.R. Grace Company containing about 13% alumina by weight and having a surface area of about 400 $m^2/g$ and a pore volume of about 1.2 mL/g. This material was obtained as a powder having an average particle size of about 70 microns. Approximately 100 grams of this material were impregnated with a solution containing about 200 mL of water and about 10 grams of ammonium hydrogen fluoride, resulting in a damp powder having the consistency of wet sand. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 450° C. At this temperature, the powder was allowed to fluidize for about three hours in the dry air. Afterward, the fluorided silica-alumina was collected and stored under dry nitrogen, and was used without exposure to the atmosphere.

The sulfated alumina activator-support employed in Examples 1-4, 7-12, and 15-16 was prepared in accordance with the following procedure. Bohemite was obtained from W.R. Grace Company under the designation "Alumina A" and having a surface area of about 300 $m^2/g$ and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the sulfated alumina activator-support was collected and stored under dry nitrogen, and was used without exposure to the atmosphere.

The chlorided zinc aluminate activator-support employed in Examples 5 and 13 was prepared in accordance with the following procedure. A mixture of 100 mL of deionized water, 13.03 grams of zinc chloride, and a few drops of nitric acid was made and contacted with 64.84 grams of Ketjen Grade B alumina. Zinc chloride is not a transition metal compound of this invention. The zinc chloride loading was 20% of the alumina. After drying overnight under vacuum at 100° C. and pushing through a 100 mesh screen, a portion of this material was calcined in dry air at 600° C. for three hours to produce the zinc aluminate mixed oxide. Approximately 35.9 g of the zinc aluminate were heated under nitrogen to 600° C. and, while maintaining this temperature, 5.5 mL of carbon tetrachloride were added to chloridate the zinc aluminate. Afterward, the chlorided zinc aluminate activator-support was collected and stored under nitrogen, and was used without exposure to the atmosphere.

All polymerizations were carried out in a one-gallon stirred reactor according to the following general procedure. First, the reactor was purged with nitrogen and heated to about 120° C. After cooling to below about 40° C. and purging with isobutane vapor, alkyl aluminum, activator-support, and the metallocene solution were added in that order through a charge port while venting isobutane vapor. The reactor was then closed. The metallocene quantity varied from 0.2 to 2.0 mg. About 0.5 mL of 1M triisobutylaluminum (TIBA) co-catalyst were used in each polymerization. Either 100 mg or 200 mg of the activator-support were used in the polymerization. About 1.8 liters of isobutane were added under pressure, and the reactor was subsequently heated to either 90° C. or 95° C. The reactor contents were mixed at 900 rpm. Ethylene was then added to the reactor, along with hydrogen, if used, at a fixed mass ratio with respect to the ethylene flow. Hydrogen was stored in a 340-mL pressure vessel and added with the ethylene via an automated feeding system, while the reactor pressure was maintained at either 390 psig or 420 psig by the combined ethylene/isobutane, or combined hydrogen/ethylene/isobutane, addition. The reactor was maintained and controlled at either 90° C. or 95° C. throughout the 30-minute or 60-minute run time of the polymerization. Upon completion, the isobutane and ethylene were vented from the reactor, the reactor was opened, and the polymer product was collected and dried.

Examples 1-8

Polymers Produced Using Titanium-Containing Sulfated Alumina

Approximately 2 mg were used in Examples 1-6, and 1 mg was used in Examples 7-8, of the following metallocene compound:

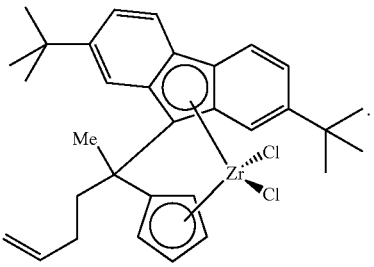

This compound can be prepared in accordance with any suitable method. One such technique is described in U.S. Pat. No. 7,064,225, the disclosure of which is incorporated herein by reference in its entirety.

Certain polymerization components and the resultant polymer properties for Examples 1-8 are listed in Table I. Examples 1, 3, and 7 were Comparative Examples using a sulfated alumina activator support, while Comparative Examples 5 and 6 employed titanium-containing chlorided alumina and titanium-containing fluorided silica-alumina, respectively. Examples 2, 4, and 8 utilized the titanium-containing sulfated alumina in accordance with this invention.

For Examples 2, 4-6, and 8, titanium was impregnated into the treated solid oxides by the following procedure. At room temperature (about 25° C.), $TiCl_4$ was dissolved in heptane and was added to a slurry of the respective treated solid oxide in heptane. $TiCl_4$ was used at a weight percentage of about 1.1%, based on the weight of the treated solid oxide. This mixture was stirred for about 2 to 3 minutes. The solvent was removed under vacuum at a temperature of about 25 to 30° C., resulting in a free-flowing solid, titanium-containing activator-support. No subsequent calcining was conducted on these titanium-containing activator-supports.

Following the general polymerization procedure provided above, 100 mg of the activator-support were used for Examples 1-8, and the polymerization process was conducted at a reactor temperature of 90° C., a reactor pressure of 390 psig, and a reaction time of 30 minutes.

Figure 2:
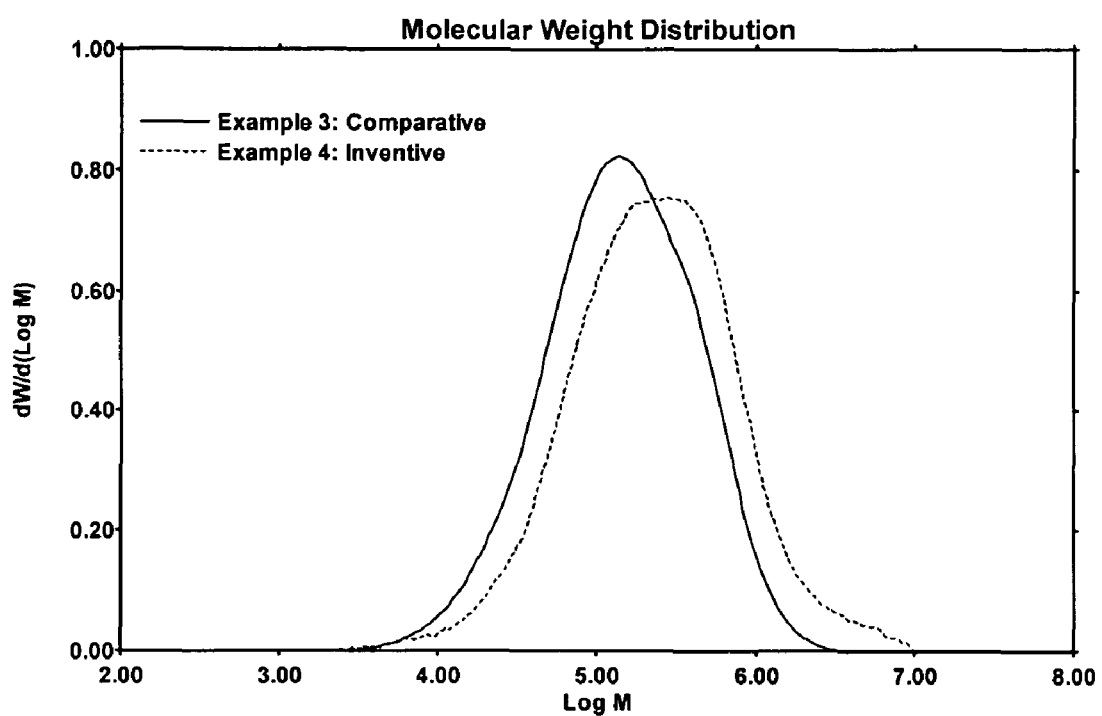
FIG. 2 presents a plot of the molecular weight distributions of the polymers of Examples 3-4.

FIG. 1 compares the molecular weight distributions of the polymers of Examples 1 and 2, while FIG. 2 compares the molecular weight distributions of Examples 3 and 4. As shown in Table I and FIGS. 1-2, polymers produced using the sulfated alumina activator-support containing titanium had broader molecular weight distributions (e.g., higher Mw/Mn and Mz/Mw) than the polymers produced using sulfated alumina, whether in the presence or the absence of hydrogen. Higher molecular weight polymer was also produced due to the presence of titanium in the activator-support, as reflected in the Mw and Mz values in Table I and the high molecular weight tail illustrated graphically in FIGS. 1-2.

As compared to the polymers of Examples 5-6, the polymer of Example 2, produced using a titanium-impregnated sulfated alumina activator support, had a higher Mw and Mz, and a higher molecular weight tail as reflected in the ratio of Mz/Mw. Interestingly, the catalyst activity of the titanium-containing sulfated alumina was far superior to that of either titanium-containing chlorided zinc aluminate or fluorided silica-alumina, each evaluated under the same polymerization conditions and using the same metallocene compound. The catalyst activity of the titanium-containing sulfated alumina (Example 2) was 3.5 times that of the titanium-containing chlorided zinc aluminate (Example 5) and over 10 times that of titanium-containing fluorided silica-alumina (Example 6).

In contrast with Examples 1-6, Examples 7-8 utilized only 1 mg of the metallocene compound depicted above. However, the same general results were found in Table I: polymers produced using the sulfated alumina activator-support containing titanium had broader molecular weight distributions (e.g., higher Mw/Mn and Mz/Mw) and higher molecular weights (e.g., Mw, Mz) than the polymers produced using sulfated alumina which was not impregnated with titanium.

The weight percent of the total polymer of Example 2, Example 4, and Example 8 having a molecular weight greater than 1,000,000 g/mol was 14.5%, 9.7%, and 18.4%, respectively. Additionally, the weight percent of the total polymer of Example 2, Example 4, and Example 8 having a molecular weight greater than 3,000,000 g/mol was 3.2%, 1.9%, and 7.3%, respectively.

TABLE I

Polymerization Conditions and Polymer Properties of Examples 1-8.

| Example | Type | H₂/Ethylene Feed (ppm) | Activator-Support | g PE produced |
|---|---|---|---|---|
| 1 | Comparative | 0 | SA | 136 |
| 2 | Inventive | 0 | SA-Ti | 150 |
| 3 | Comparative | 200 | SA | 182 |
| 4 | Inventive | 200 | SA-Ti | 150 |
| 5 | Comparative | 0 | CZA-Ti | 42 |
| 6 | Comparative | 0 | FSA-Ti | 13 |
| 7 | Comparative | 200 | SA | 82 |
| 8 | Inventive | 200 | SA-Ti | 111 |

| Example | Mn/1000 (g/mol) | Mw/1000 (g/mol) | Mz/1000 (g/mol) | Mw/Mn | Mz/Mw |
|---|---|---|---|---|---|
| 1 | 182 | 383 | 710 | 2.1 | 1.9 |
| 2 | 231 | 656 | 2287 | 2.8 | 3.5 |
| 3 | 74 | 236 | 561 | 3.2 | 2.4 |
| 4 | 103 | 457 | 1797 | 4.5 | 3.9 |
| 5 | 177 | 493 | 1399 | 2.8 | 2.8 |
| 6 | 207 | 506 | 1282 | 2.4 | 2.5 |
| 7 | 80 | 259 | 577 | 3.3 | 2.2 |
| 8 | 91 | 848 | 3978 | 9.3 | 4.7 |

Examples 9-10

Polymers Produced Using Vanadium-Containing Sulfated Alumina

In Examples 9-10, 2 mg of the metallocene compound used in Examples 1-8 were employed, illustrated by the following structure:

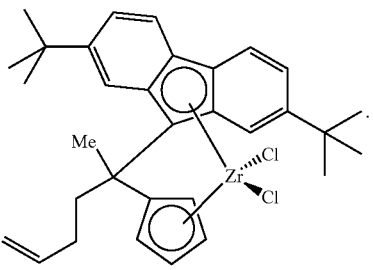

Certain polymerization components and the resultant polymer properties for Examples 9-10 are listed in Table II. Example 10 was a Comparative Example using a sulfated alumina activator-support, while Example 9 utilized a vanadium-containing sulfated alumina in accordance with this invention.

For Example 9, vanadium was impregnated into the sulfated alumina by the following procedure. At room temperature (about 25° C.), VOCl₃ was dissolved in heptane and was added to a slurry of the sulfated alumina in heptane. VOCl₃ was used at a weight percentage of about 1%, based on the weight of the sulfated alumina. This mixture was stirred for about 2 to 3 minutes. The solvent was removed under vacuum at a temperature of about 25 to 30° C., resulting in a free-flowing solid, vanadium-containing sulfated alumina. No subsequent calcining was conducted on the vanadium-containing sulfated alumina.

Following the general polymerization procedure provided above, 100 mg of the activator-support were used for Examples 9-10, and the polymerization process was conducted at a reactor temperature of 90° C., a reactor pressure of 390 psig, and a reaction time of 30 minutes.

Figure 3:
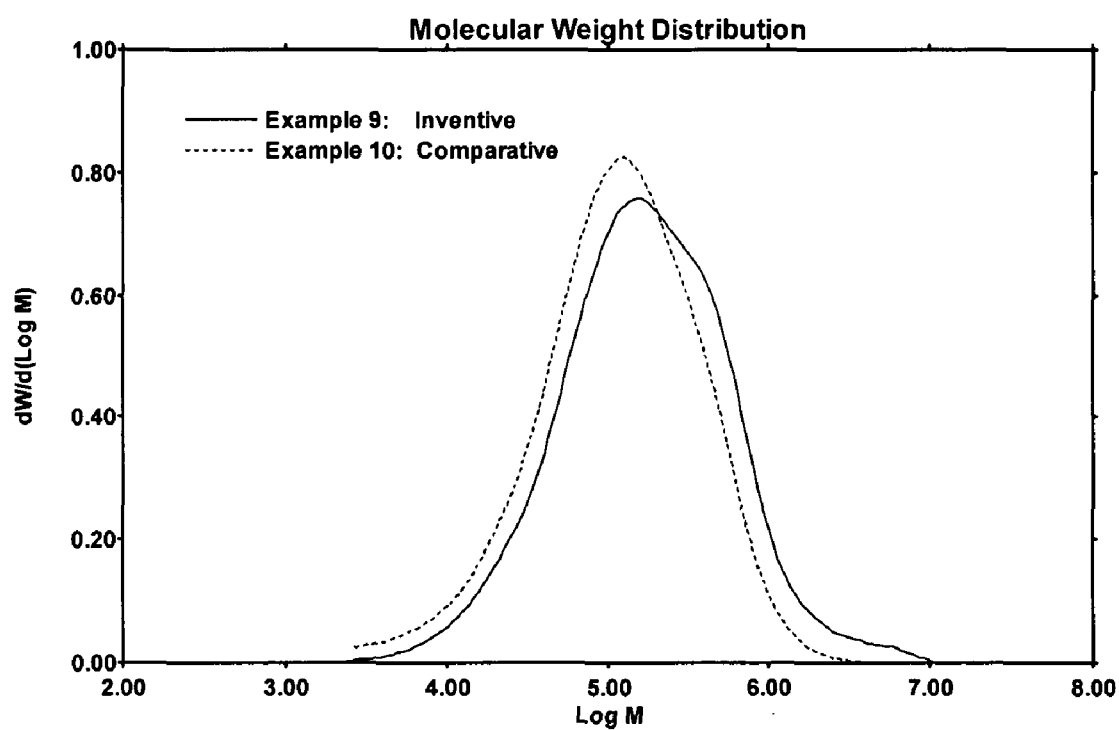
FIG. 3 presents a plot of the molecular weight distributions of the polymers of Examples 9-10.

FIG. 3 compares the molecular weight distributions of the polymers of Examples 9 and 10. As shown in Table II and FIG. 3, a polymer produced using the sulfated alumina activator-support containing vanadium had broader molecular weight distributions (e.g., higher Mw/Mn and Mz/Mw) than the polymer produced using sulfated alumina alone. Higher molecular weight polymer was also produced due to the presence of vanadium in the activator-support, as reflected in the Mw and Mz values in Table II and the high molecular weight tail illustrated graphically in FIG. 3. The weight percent of the total polymer of Example 9 having a molecular weight greater than 1,000,000 g/mol was 6.2%, and greater than 3,000,000 g/mol was 1.3%.

TABLE II

Polymerization Conditions and Polymer Properties of Examples 9-10.

| Example | Type | H₂/Ethylene Feed (ppm) | Activator-Support | g PE produced |
|---|---|---|---|---|
| 9 | Inventive | 200 | SA-V | 178 |
| 10 | Comparative | 200 | SA | 189 |

| Example | Mn/1000 (g/mol) | Mw/1000 (g/mol) | Mz/1000 (g/mol) | Mw/Mn | Mz/Mw |
|---|---|---|---|---|---|
| 9 | 77 | 359 | 1699 | 4.7 | 4.7 |
| 10 | 54 | 206 | 548 | 3.8 | 2.7 |

Examples 11-16

Polymers Produced Using Zirconium-Containing Sulfated Alumina

In Examples 11-14, the following metallocene compound was employed:

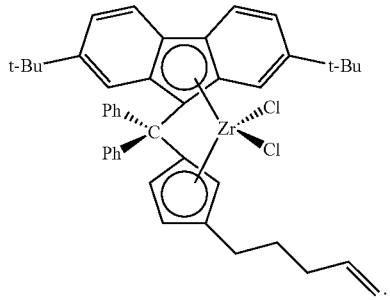

This compound can be prepared in accordance with any suitable method. One such technique is described in U.S. Patent Publication No. 2007/0179044, the disclosure of which is incorporated herein by reference in its entirety.

Certain polymerization components and the resultant polymer properties for Examples 11-16 are listed in Table III. Examples 12 and 15 were Comparative Examples using a sulfated alumina activator support, while Comparative Examples 13 and 14 employed zirconium-containing chlorided zinc aluminate and zirconium-containing fluorided silica-alumina, respectively. Examples 11 and 16 utilized the zirconium-containing sulfated alumina in accordance with this invention.

For Examples 11, 13-14, and 16, zirconium was impregnated into the treated solid oxides by the following procedure. At room temperature (about 25° C.), Zr(NMe₂)₄ was dissolved in heptane and was added to a slurry of the respective treated solid oxide in heptane. $Zr(NMe_2)_4$ was used at a weight percentage of about 1%, based on the weight of the treated solid oxide. This mixture was stirred for about 2 to 3 minutes. The solvent was removed under vacuum at a temperature of about 25 to 30° C., resulting in a free-flowing solid, zirconium-containing activator-support. No subsequent calcining was conducted on these zirconium-containing activator-supports.

Following the general polymerization procedure provided above, 0.2 mg of the metallocene and 200 mg of the activator-support were used for Examples 11-16, and the polymerization process was conducted at a reactor temperature of 95° C., a reactor pressure of 420 psig, and a reaction time of 60 minutes.

Figure 4:
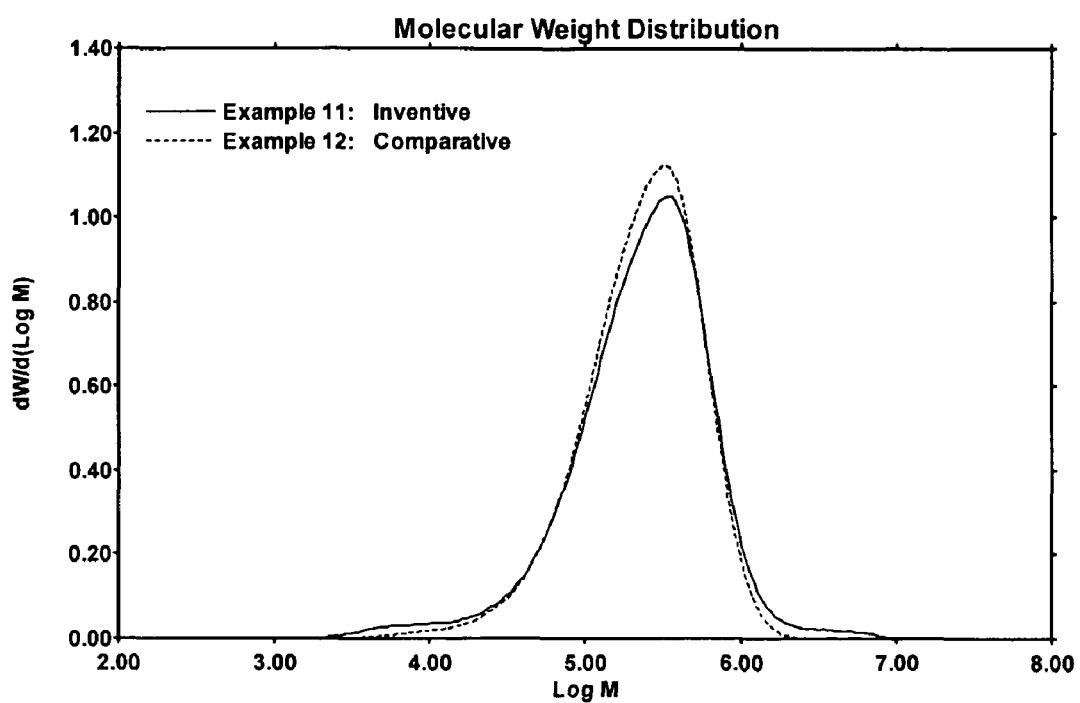
FIG. 4 presents a plot of the molecular weight distributions of the polymers of Examples 11-12.

FIG. 4 compares the molecular weight distributions of the polymers of Examples 11 and 12. As shown in Table III and FIG. 4, polymer produced using the sulfated alumina activator-support containing zirconium had a broader molecular weight distribution (e.g., higher Mw/Mn and Mz/Mw) than the polymer produced using sulfated alumina. Higher molecular weight polymer was also produced due to the presence of zirconium in the activator-support, as reflected in the Mw and Mz values in Table III and the high molecular weight tail illustrated graphically in FIG. 4. The weight percent of the total polymer of Example 11 having a molecular weight greater than 1,000,000 g/mol was 4.5%, and greater than 3,000,000 g/mol was 0.8%.

As compared to the polymers of Examples 13-14, the polymer of Example 11, produced using a zirconium-impregnated sulfated alumina activator support, had a higher ratio of Mz/Mw. Surprisingly, the catalyst activity of the zirconium-containing sulfated alumina was far superior to that of either zirconium-containing chlorided zinc aluminate or fluorided silica-alumina, each evaluated under the same polymerization conditions and using the same metallocene compound. The catalyst activity of the zirconium-containing sulfated alumina (Example 11) was 12 times that of the zirconium-containing fluorided silica-alumina (Example 14) and 40 times that of zirconium-containing chlorided zinc aluminate (Example 13).

Examples 15-16 were conducted under the same polymerization conditions as Examples 11-14, except that a metallocene compound was not used. Rather, 2 mg of $Zr(NMe_2)_4$ were used to conduct the polymerization. In Example 16, 2 mg of $Zr(NMe_2)_4$ were impregnated on the sulfated alumina, in the manner described above, to form a zirconium-containing activator-support. The same amount of $Zr(NMe_2)_4$ was used in Example 15, except the zirconium was not impregnated onto the sulfated alumina.

As compared to the polymer of Example 15, the polymer of Example 16, produced using a zirconium-impregnated sulfated alumina activator support, had a much higher molecular weight, as reflected in both the Mw and the Mz. The weight percent of the total polymer of Example 16 having a molecular weight greater than 1,000,000 g/mol was about 50%, and greater than 3,000,000 g/mol was about 20%. Also, unexpectedly, the catalyst activity of the zirconium-containing sulfated alumina was far superior to that of the sulfated alumina without incorporation of zirconium, each evaluated under the same polymerization conditions and using the same amount of $Zr(NMe_2)_4$. The catalyst activity of the zirconium-containing sulfated alumina (Example 16) was over 3 times that of sulfated alumina without incorporation of zirconium (Example 15).

TABLE III

Polymerization Conditions and Polymer Properties of Examples 11-16.

| Example | Type | H$_2$/Ethylene Feed (ppm) | Activator-Support | g PE produced |
|---|---|---|---|---|
| 11 | Inventive | 200 | SA-Zr | 281 |
| 12 | Comparative | 200 | SA | 231 |
| 13 | Comparative | 200 | CZA-Zr | 7 |
| 14 | Comparative | 200 | FSA-Zr | 23 |
| 15 | Comparative | 200 | SA | 4 |
| 16 | Inventive | 200 | SA-Zr | 13 |

| Example | Mn/1000 (g/mol) | Mw/1000 (g/mol) | Mz/1000 (g/mol) | Mw/Mn | Mz/Mw |
|---|---|---|---|---|---|
| 11 | 99 | 370 | 1116 | 3.7 | 3.0 |
| 12 | 132 | 309 | 504 | 2.4 | 1.6 |
| 13 | 59 | 981 | 2673 | 16.7 | 2.7 |
| 14 | 260 | 613 | 1609 | 2.4 | 2.6 |
| 15 | 47 | 1168 | 2903 | 24.7 | 2.5 |
| 16 | 270 | 1814 | 4238 | 6.7 | 2.3 |

Constructive Example 17

Constructive Synthesis of a Metal-Containing Sulfated Activator-Support in the Vapor Phase The starting material for Constructive Example 17 can be a sulfated alumina activator-support prepared in a manner similar to the procedure described above. For instance, approximately 10 g of the sulfated alumina activator-support are placed in a quartz tube fitted with a sintered quartz disk at the bottom. The quartz tube can be, for example, about 1.5 to about 2 inches in diameter. To fluidize the sulfated alumina, dry air (nitrogen can be substituted) is blown upward through the disk at a linear rate of about 0.05 ft/s at 25° C. Volumetric flow rates of about 1.6 to about 1.8 standard cubic feet per hour can be used. An electric furnace around the quartz tube is then turned on and the temperature is increased to about 600° C. over an approximate 90-minute time period. This temperature is maintained for about three hours and then the tube is removed from the furnace and allowed to cool to about 25° C.

Titanium can be impregnated onto the sulfated alumina as follows. About 0.1 g of liquid TiCl$_4$ is injected into the air stream at about 25° C. onto a second porous disk, which is below the sintered quartz disk in the quartz tube. Air continues to flow upward through both disks, fluidizing the powdered sulfated alumina. After about 15 min, it is expected that all of the TiCl$_4$ has evaporated and contacted the sulfated alumina, resulting in a good distribution of, and an almost complete adsorption of, the titanium onto the sulfated alumina. This product is a titanium-containing sulfated alumina activator-support.

The titanium-containing sulfated alumina can be used in combination with an alkyl aluminum co-catalyst to polymerize olefins, such as ethylene, in the absence of a metallocene compound, in a manner similar to Example 16. A polymer having a Mw of from about 1,000,000 to about 3,000,000 can be produced.

The titanium-containing sulfated alumina can be used with a metallocene compound and an alkyl aluminum co-catalyst to polymerize olefins, such as ethylene, in a manner similar to Examples 2, 4, and 8. A polymer produced in this manner will have a molecular weight distribution which can be considered to consist of two components, one being a typical unimodal, bell-shaped curve, and the other being a high molecular weight tail, the high molecular weight tail resulting from the titanium-containing sulfated alumina.

We claim:

1. A process to produce a metal-containing sulfated activator-support comprising:
    (a) contacting a solid oxide with a sulfate compound to produce a sulfated solid oxide;
    (b) calcining the sulfated solid oxide to produce a calcined sulfated solid oxide; and
    (c) contacting the calcined sulfated solid oxide with a vapor comprising a transition metal compound;
to produce the metal-containing sulfated activator-support.

2. The process of claim 1, wherein the sulfate compound comprises sulfuric acid, ammonium sulfate, or a combination thereof.

3. The process of claim 1, wherein the transition metal compound comprises titanium, zirconium, hafnium, vanadium, molybdenum, tungsten, iron, cobalt, nickel, copper, scandium, yttrium, lanthanum, or any combination thereof.

4. The process of claim 1, wherein the solid oxide is calcined prior to step (a).

5. The process of claim 1, wherein the metal-containing sulfated activator-support is not calcined.

6. A process to produce a metal-containing sulfated activator-support comprising:
    (a) contacting a solid oxide with a sulfate compound while calcining to produce a calcined sulfated solid oxide; and
    (b) contacting the calcined sulfated solid oxide with a vapor comprising a transition metal compound;
to produce the metal-containing sulfated activator-support.

7. The process of claim 6, wherein the sulfate compound comprises sulfuric acid, ammonium sulfate, or a combination thereof.

8. The process of claim 6, wherein:
    the transition metal compound comprises titanium, zirconium, hafnium, vanadium, molybdenum, tungsten, iron, cobalt, nickel, copper, scandium, yttrium, lanthanum, or any combination thereof; and
    the solid oxide comprises silica, alumina, silica-alumina, aluminophosphate, titania, zirconia, magnesia, boria, zinc oxide, any mixed oxide thereof, or any combination thereof.

9. The process of claim 6, wherein the solid oxide is calcined prior to step (a).

10. The process of claim 6, wherein the metal-containing sulfated activator-support is not calcined.

11. The process of claim 6, wherein a weight percent of the transition metal compound to the metal-containing sulfated activator-support is in a range from about 0.01 to about 10 percent.

12. The process of claim 6, wherein:
    the transition metal compound comprises titanium, zirconium, hafnium, vanadium, or any combination thereof; and
    the solid oxide comprises silica, alumina, silica-alumina, or any combination thereof.

13. The process of claim 1, wherein the solid oxide comprises silica, alumina, silica-alumina, aluminophosphate, titania, zirconia, magnesia, boria, zinc oxide, any mixed oxide thereof, or any combination thereof.

14. The process of claim 1, wherein in step (b), the sulfated solid oxide is calcined at a temperature in a range from about 350° C. to about 600° C. for about 0.3 to about 20 hours.

15. The process of claim 1, wherein a weight percent of the transition metal compound to the metal-containing sulfated activator-support is in a range from about 0.01 to about 10 percent.

16. The process of claim 1, wherein:
    the transition metal compound comprises titanium, zirconium, hafnium, vanadium, or any combination thereof; and
    the solid oxide comprises silica, alumina, silica-alumina, or any combination thereof.

17. The process of claim 16, wherein:
    the transition metal compound comprises $TiCl_4$; and
    the ratio of the sulfate compound to the solid oxide is greater than about 0.5 mmol/g.

18. The process of claim 12, wherein:
    the transition metal compound comprises $TiCl_4$; and
    the ratio of the sulfate compound to the solid oxide is greater than about 0.5 mmol/g.

19. The process of claim 16, wherein a weight percent of the transition metal compound to the metal-containing sulfated activator-support is in a range from about 0.1 to about 5 percent.

20. The process of claim 12, wherein a weight percent of the transition metal compound to the metal-containing sulfated activator-support is in a range from about 0.1 to about 5 percent.

* * * * *